(12) United States Patent
Tokoro et al.

(10) Patent No.: US 8,407,370 B2
(45) Date of Patent: Mar. 26, 2013

(54) STORAGE APPARATUS FOR CONTROLLING RUNNING OF COMMANDS AND METHOD THEREFOR

(75) Inventors: Ken Tokoro, Odawara (JP); Yuta Kajiwara, Odawara (JP); Yasuhiko Yamaguchi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 12/935,637

(22) PCT Filed: Sep. 9, 2010

(86) PCT No.: PCT/JP2010/005528
§ 371 (c)(1),
(2), (4) Date: Sep. 30, 2010

(87) PCT Pub. No.: WO2012/032577
PCT Pub. Date: Mar. 15, 2012

(65) Prior Publication Data
US 2012/0066413 A1    Mar. 15, 2012

(51) Int. Cl.
*G06F 3/00*    (2006.01)

(52) U.S. Cl. .......................................................... 710/6
(58) Field of Classification Search ........................ 710/6
See application file for complete search history.

(56) References Cited

U.S. PATENT DOCUMENTS
2008/0273545 A1 * 11/2008 Sgouros et al. ............... 370/412
2010/0100645 A1    4/2010 Yamaguchi et al.

FOREIGN PATENT DOCUMENTS
EP    1936487 A2 *  6/2008
EP    1986090 A2    10/2008
JP    2010-102458 A  5/2010

* cited by examiner

*Primary Examiner* — Chun-Kuan Lee
(74) *Attorney, Agent, or Firm* — Mattingly & Malur, PC

(57) ABSTRACT

A plurality of command storage areas respectively corresponding to a plurality of priorities and storing I/O commands in a storage control apparatus are common to a plurality of ports and a plurality of processors. Here, regardless of which port receives an I/O command, the I/O command is stored in a command storage area corresponding to a priority which is given to the I/O command. The plurality of processors run the I/O commands in the plurality of command storage areas so that an I/O command with a higher priority is run more often within a given period of time.

1 Claim, 24 Drawing Sheets

FIG. 5

| Port# | S_ID | LUN | MPPK# |
|---|---|---|---|
| 0 | 0.0.1 | 0 | 0 |
| 1 | 0.1.3 | 2047 | 15 |
| ⋮ | ⋮ | ⋮ | ⋮ |
| 7 | 0.0.1 | 53 | 2 |

FIG. 8

| PQ# | 0 | 1 | ........ | 15 |
|---|---|---|---|---|
| Number Of Registered Queues | Q0 | Q1 | ........ | Q15 |
| Number Of Running Commands | R0 | R1 | ........ | R15 |
| Maximum Number Of Runnable Commands | T0 | T1 | ........ | T15 |

900

901 — Number Of Registered Queues
902 — Number Of Running Commands
903 — Maximum Number Of Runnable Commands

| | PQ#0 | PQ#1 | PQ#2 |
|---|---|---|---|
| Concurrency Value | 5 | 2 | 1 |

FIG. 20

| # | Information | Unit Of Measure In MPPK | Unit Of Acquisition | Unit Of SM Update |
|---|---|---|---|---|
| 1 | IO Processing Count [IOPS] | Each PQ | Each Completion Of I/O Processing | 1 sec Cycle |
| 2 | Data Traffic [KB/s] | Each PQ | Each Completion Of I/O Processing | 1 sec Cycle |
| 3 | Average Response Time | Each PQ | Each Completion Of I/O Processing | 1 sec Cycle |
| 4 | Number Of Registered Queues | Each PQ | 50 Ms Cycle (Momentary Value) | 1 sec Cycle |
| 5 | Number Of Running Jobs | Each PQ | 50 Ms Cycle (Momentary Value) | 1 sec Cycle |
| 6 | Information Update Count Value | Each PQ | None | 1 sec Cycle |

| Qos Zone ID | Host ID (S_ID) | MPPK# | LUN |
|---|---|---|---|
| X | 0.0.1<br>0.0.2 | 0 | 1<br>2<br>3 |
| Y | 0.0.3<br>0.0.4 | 1<br>2<br>3 | 4<br>5<br>6<br>7<br>8 | p
STORAGE APPARATUS FOR CONTROLLING RUNNING OF COMMANDS AND METHOD THEREFOR

TECHNICAL FIELD

The present invention relates to technology for controlling the running of commands in a storage apparatus.

BACKGROUND ART

Known is a storage apparatus that controls the running of commands based on the priority set to the command. Specifically, for example, known is a storage apparatus that runs I/O commands issued based on Qos (Quality of service) control. This type of storage apparatus receives an I/O (Input/Output) command given a priority, and controls the running of the I/O command based on the priority given to that I/O command (for example, refer to Patent Document 1).

CITATION LIST

Patent Literature

[PTL (Patent Literature) 1] Japanese Patent Application Laid-open No. 2010-102458

SUMMARY OF INVENTION

Technical Problem

A communication interface device included in the storage apparatus generally comprises a port and an MP (Microprocessor) associated with that port. Here, an I/O command received by a certain port is run only with an MP that is associated with that port.

Thus, if I/O commands are concentrated on one port among a plurality of ports, there is a possibility that the plurality of I/O commands received by that port will not run as expected.

Moreover, since the I/O commands received by a port are once accumulated in a storage area (typically a queue), it is necessary to prepare a plurality of queues respectively corresponding to all priorities for each port. Thus, the amount of queue information (information concerning the queue) that needs to be managed will be significant.

This will occur even if the storage area storing the commands is a storage area other than the queue.

Accordingly, an object of this invention is to enable the I/O commands received by one port to run as expected even if such I/O commands are concentrated on such port, and to reduce the amount of management information of the command storage area that needs to be managed in the storage control apparatus.

Solution to Problem

A plurality of command storage areas (queues, for example) respectively corresponding to a plurality of priorities and storing I/O commands in a storage control apparatus are common to a plurality of ports and a plurality of processors. Here, regardless of which port receives an I/O command, the I/O command is stored in a command storage area corresponding to a priority which is given to the I/O command. The plurality of processors run the I/O commands in the plurality of command storage areas so that an I/O command with a higher priority is run more often within a given period of time.

The storage control apparatus may be a storage apparatus comprising a plurality of physical storage devices to become the basis of a plurality of logical volumes, or an intelligent switching device that is able to intervene between a storage apparatus and a host computer.

BRIEF DESCRIPTION OF DRAWINGS

FIG. 5 shows a sort destination search table.

FIG. 8 shows a queue management table.

FIG. 20 shows a table representing the types of operational status information to be fed back to the Qos main control unit 10.

DESCRIPTION OF EMBODIMENT

An embodiment of the present invention is now explained with reference to the attached drawings. Note that, in the ensuing explanation, various types of information may be explained using an expression such as "xxx table," but the various types of information may be expressed as a data structure other than tables. In order to show that various types of information are not dependent on a data structure, the expression "xxx table" can be referred to as "xxx information."

Moreover, in the ensuing explanation, an ID (identifier) or a number is used as the identifying information for specifying an element, but a name, number or the like may also be used as the identifying information.

Furthermore, in the ensuing explanation, let it be assumed that the commands to be run are I/O commands. Nevertheless, the commands to be run may be various other commands in substitute for or in addition to the I/O commands.

Figure 1:
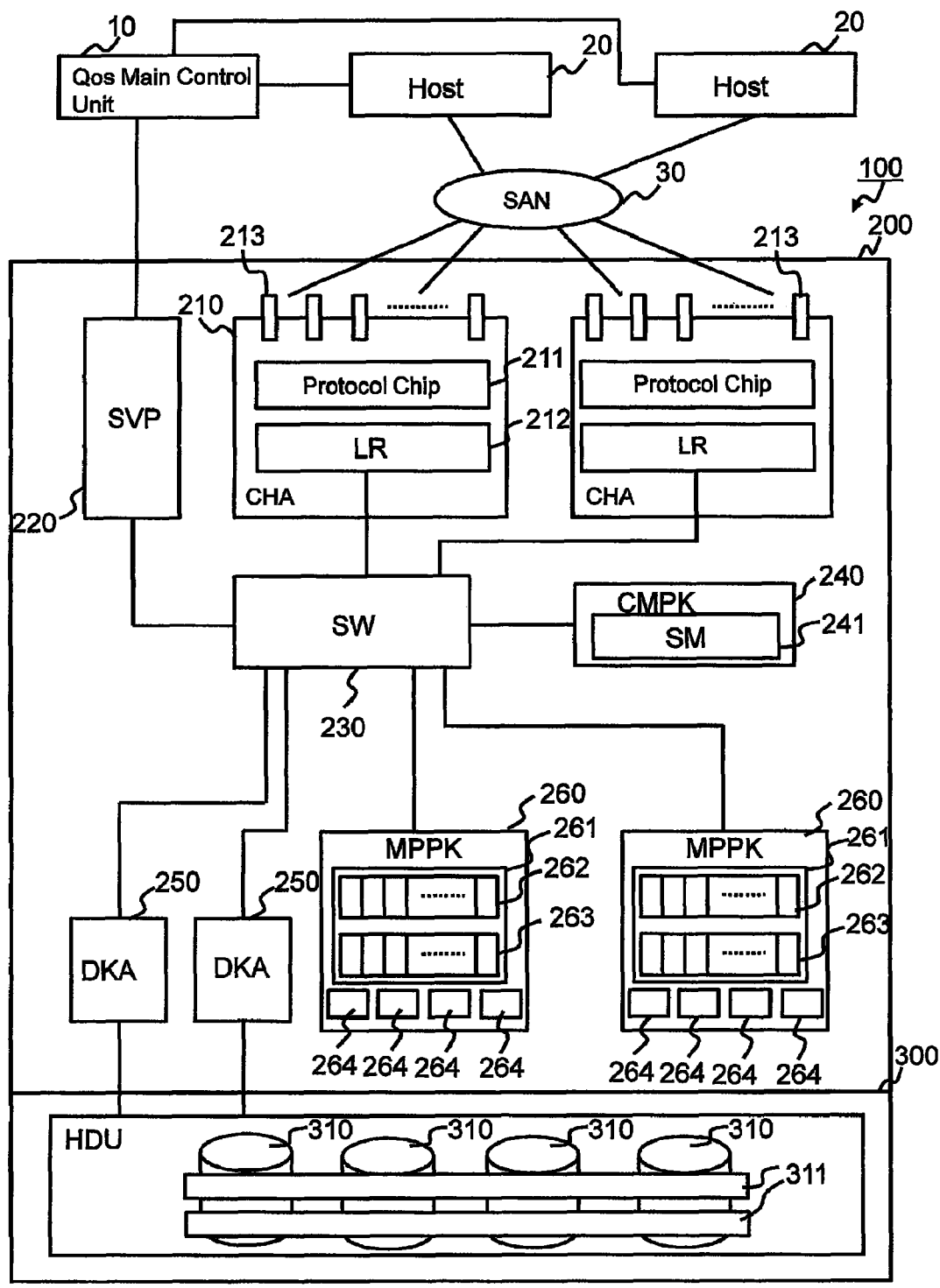
FIG. 1 shows a configuration example of the computer system according to an embodiment of the present invention.

FIG. 1 shows a configuration example of the computer system according to an embodiment of the present invention.

The computer system comprises a Qos main control unit 10, (one or) a plurality of hosts 20 connected to the Qos main control unit 10, and a storage apparatus 100 connected to the host 20 via a communication network 30.

The communication network 30 is a SAN (Storage Area Network) according to FIG. 1, but it may also be another type of network (for example, a LAN (Local Area Network), dedicated line or public line). The exchange of data between the host 20 and the storage apparatus 100 is performed according to a predetermined communication protocol (for example, a TCP/IP (Transmission Control Protocol/Internet Protocol), or a Fibre Channel protocol).

The Qos main control unit 10 is a device (a computer, for example) for performing Qos control. The Qos main control unit 10 includes a function of controlling the frequency of issuing I/O commands. Moreover, the Qos main control unit 10 decides the priority to be given to the I/O commands that are sent from the host 20. The number of Qos main control units 10 may be one as shown in FIG. 1, or the Qos main control unit 10 may be provided to the respective hosts 20. Specifically, for example, the Qos main control unit 10 may be a function that is exhibited as a result of a predetermined computer program being executed by a CPU of the host 20.

The host 20 is a computer comprising a CPU, a memory and the like. The host 20 recognizes a logical storage area (hereinafter referred to as the "LDEV (Logical DEVice)") that is provided by the storage apparatus 100, and issues an I/O command designating that LDEV. The I/O command is given a priority (set with information representing the priority). The priority given to the I/O command is the priority according to the information that is sent from the Qos main control unit 10.

The storage apparatus 100 includes a controller 200, and a disk device 300.

According to FIG. 1, the disk device 300 is a HDU (Hard Disk Unit) that is configured from a plurality of disk-type physical storage devices (for example, HDDs (Hard Disk Drives)) 310. The disk device 300 includes, for example, a plurality of RAID (Redundant Array of Independent (or Inexpensive) Disks) groups. Based on the RAID group, a LDEV (Logical DEVice) 311 is formed as a storage area. Note that various other storage devices (flash memory device, for example) may be adopted as the physical storage device.

The controller 200 includes CHAS (CHannel Adaptors) 210, a SVP (Service Processor) 220, a SW (SWitch) 230, a CMPK (Cache Memory PacKage) 240, DKAs (Disk Adaptors) 250, and MPPKs (Microprocessor PacKages) 260.

Each CHA 210 is a communication interface device for exchanging data with an external device of the storage apparatus 100. Each CHA 210 includes a protocol chip 211, a LR (Local Router) 212, and a plurality of ports 213. The protocol chip 211 comprises a circuit for sending and receiving data with a predetermined protocol (a Fibre Channel protocol, for example), and a circuit for analyzing the I/O commands from the host 20. The LR 212 is a circuit for sorting the I/O commands from the host 20 to the MPPK 260.

The SVP 220 is a device (a computer, for example) for monitoring the operational status of the storage apparatus 200. The SVP 220 collects information representing the operational status (hereinafter referred to as the "operational status information") of the controller 200, and the operational status information of the disk device 300, and sends (feeds back) the collected operational status information to the Qos main control unit 10.

The SW 230 is connected to the CHAS 210, the SVP 220, the CMPK 240, the DKAs 250 and the MPPKs 260. The SW 230 is a switching device (a cross-bar switch, for example), and the CHAS 210, the SVP 220, the CMPK 240, the DKAs 250 and the MPPKs 260 are able to mutually communicate via the SW 230. The SVP 220 may be connected to at least one among the CHAS 210, the DKAs 250 and the MPPKs 260 in substitute for the SW 230.

The CMPK 240 includes a SM (Shared Memory) 241. The SM 241 is a memory that is shared among a plurality of MPPKs 260. The SM 241 includes a cache area (not shown). Data to be written into the LDEV 311 (write target data received by the CHAS 210) and data read from the LDEV 311 via the DKAs 250 are temporarily stored in the cache area.

The DKAs 250 send and receive data to and from the CHAS 210 and the disk device 300 via the CMPK 240.

If a CHA 210 receives a write command from the host 20, it transfers the write command to the MPPK 260 among a plurality of MPPKs 260 that is in charge of the LDEV designated in the write command. The write target data that is associated with the write command is once stored in the CMPK 240 (SM 241). Subsequently, the MP that ran the write command (MP in the MPPK 260 of the transfer destination of the write command) reads the write target data from the CMPK 240 (SM 241), and the data is written into the LDEV 311 designated in the write command via a DKA 250.

Moreover, if a CHA 210 receives a read command from the host 20, it transfers the read command to the MPPK 260 among a plurality of MPPKs 260 that is in charge of the LDEV designated in the read command. The read target data is read by the MP that ran the read command (MP in the MPPK 260 of the transfer destination of the read command) from the LDEV 311 via a DKA 250. The read target data that was read is once stored in the CMPK 240 (SM 241). Subsequently, the read target data is read from the CMPK 240 (SM 241), and that data is sent from the CHA 210 to the host 20.

As described above, when the I/O command (write command or read command) is run, the I/O of data to and from the LDEV is executed.

Each MPPK 260 includes a local memory 261, and a plurality of MPs (Microprocessors) 264. The local memory 261 stores the I/O commands that were transferred to the MPPK 260 comprising such memory 261. The local memory 261 includes an IMQ 262, a PQ (Priority Queue) 263, a free queue (not shown), and a queue management table (refer to FIG. 8). The storage area (hereinafter referred to as the "entry") in the local memory 261 storing the I/O commands belongs to a queue of the IMQ 262, the PQ 263 or the free queue. In other words, the entry is managed in a data structure referred to as a queue. The PQ 263 is a queue that exists in the same quantity as the number of priorities that can be given to the I/O command. Specifically, the PQ 263 exists for each priority.

In the initial state, all entries belong to the free queue.

When the MPPK 260 receives an I/O command, one of the MPs 264 in that MPPK 260 acquires one entry (dequeues the entry) from the free queue, and stores the I/O command in that entry. The MP 264 couples (enqueues) the entry storing the I/O command to the IMQ. One of the MPs 264 acquires (dequeues) one entry from the IMQ, and couples (enqueues) that entry to the PQ corresponding to the priority that is given to the I/O command stored in that entry. Subsequently, one of the MPs 264 dequeues the entry from the PQ, and runs the I/O command in that entry. The MP 264 enqueues that entry to the free queue.

What level of priority should be given to which I/O command may be decided according to a predetermined rule; for example, based on the LUN (Logical Unit Number) of the LDEV that is designated in the I/O command, and/or the application program that issued the I/O command.

Figure 2:
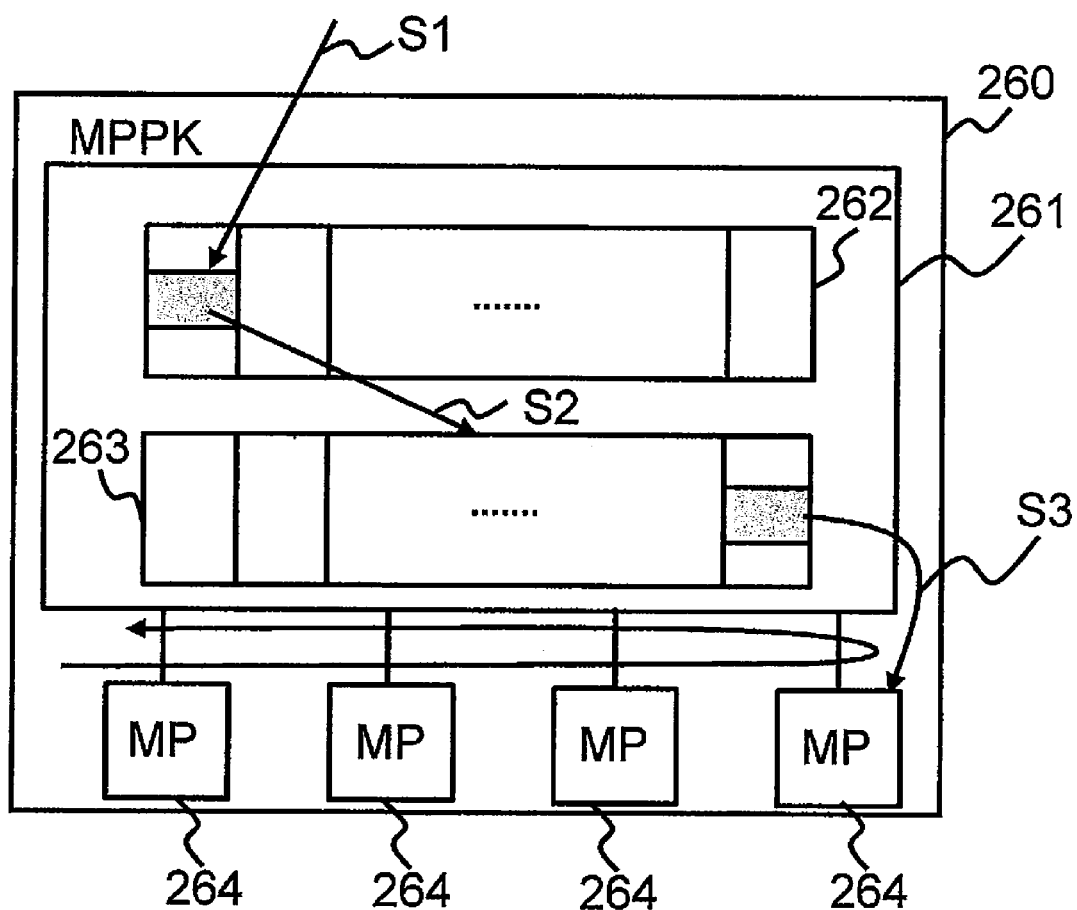
FIG. 2 shows an outline of an embodiment of the present invention.

FIG. 2 shows an outline of the present embodiment.

The MPs 264 are not associated with the ports 213 (the ports 213 and the MPs 264 are not integral), and the ports 213 and the MPs 264 are mutually independent.

A plurality of PQs 263 corresponding to a plurality of priorities exist for each MPPK 260, and for each port 213. The number of PQs 263 that exist in any MPPK 260 is the same as the number of priorities irrespective of the number of ports 213. A plurality of MPs 264 share a plurality of PQs 263 in one MPPK 260.

According to the present embodiment, it is possible to reduce the number of PQs 263 in comparison to a case of comprising a plurality of PQs 263 corresponding to a plurality of priorities for each port. Thus, it is possible to reduce the queue information (information regarding the queue) that needs to be managed.

Moreover, as described later, the Qos main control unit 10 sets one or more types of predetermined parameter values (share value and concurrency value) for each PQ 263 in units of the MPPK 260. As described above, since it is possible to reduce the number of PQs 263, the number of targets to which a parameter value needs to be set can also be reduced. The load of the Qos main control unit 10 is thereby reduced.

Figure 3:
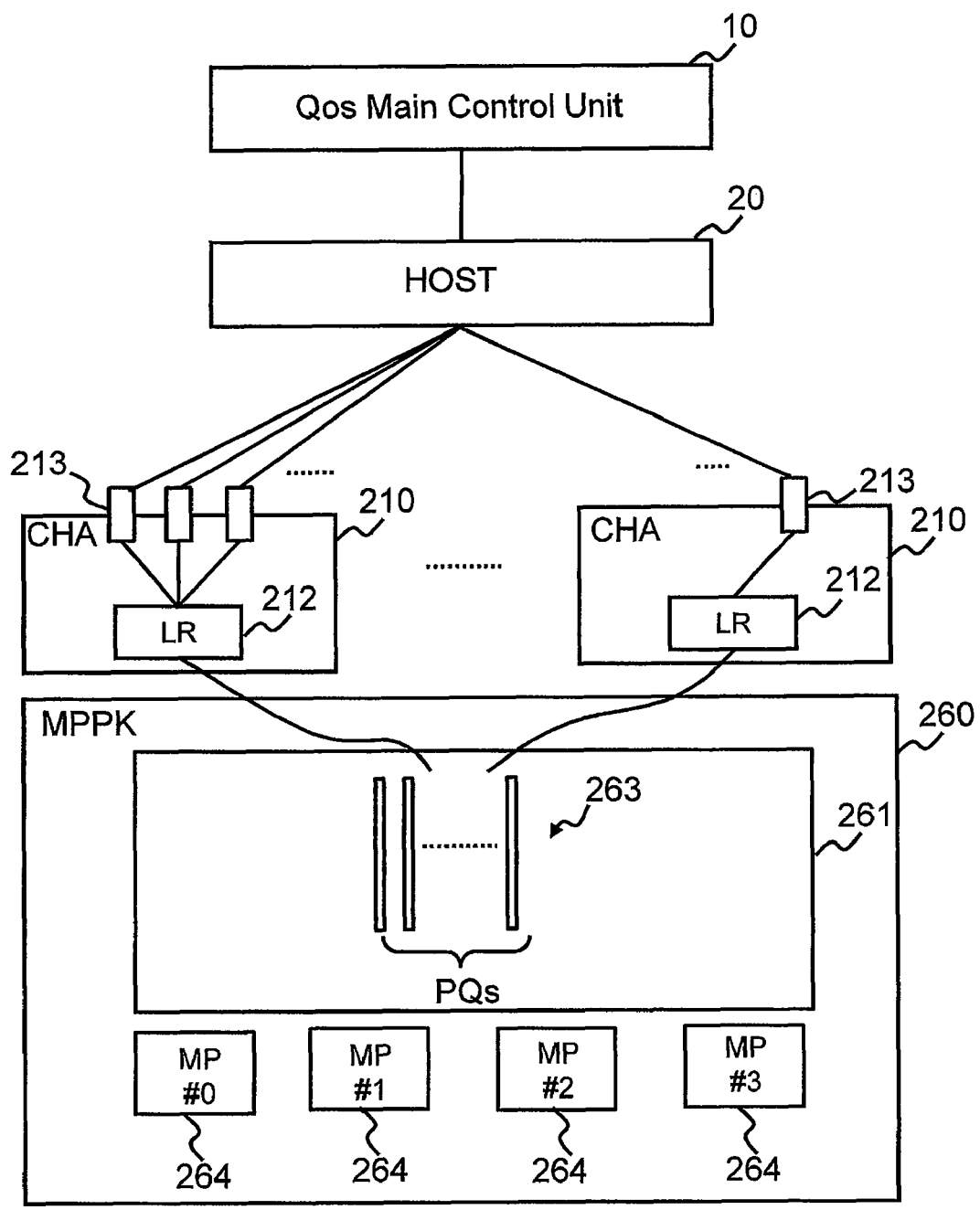
FIG. 3 shows the flow up to the MPPK 280 running an I/O command.

FIG. 3 shows the flow up to the MPPK 260 running an I/O command.

As described above, one of the MPs 264 dequeues an entry from the free queue, stores an I/O command from the host 20 in the dequeued entry, and enqueues the entry storing the I/O command to the IMQ 262 (step 1).

Moreover, as described above, one of the MPs 264 dequeues an entry from the IMQ 262, and enqueues the dequeued entry to the PQ 263 corresponding to the priority given to the I/O command in that entry (step 2).

Next, as described above, one of the MPs 264 dequeues an entry from one of the PQs 263, and runs an I/O command in that entry (step 3).

The MP 264 that executes step 3 is an MP 264 that is different from the MP 264 that executed the step 3 that immediately precedes such step 3. In other words, in this embodiment, a plurality of sequential I/O commands is not run by one MP 264, and a plurality of sequential I/O commands are run by a plurality of different MPs 264. For example, the MP 264 to run an I/O command is switched in a round robin. Specifically, for example, if the MP #0 runs one I/O command, the MP 264 to run the next I/O command is the MP #1. Thereafter, the MP 264 to run an I/O command will be the MP #2, MP #3, and the subsequent I/O command will be run by the MP #0. Note that since each MP operates independently, one MP may run a plurality of sequential I/O commands.

Accordingly, with this embodiment, a plurality of PQs 263 are shared by a plurality of MPs 264 for each MPPK 260. The MP 264 to run an I/O command in the PQ 263 will differ each time an I/O command is run. Thus, the load that is imposed upon running a plurality of I/O commands in one MPPK 260 can be distributed to a plurality of MPs 264.

Without limitation to the MP 264 which performs step 3, the MP 264 to perform step 1 and/or step 2 may also differ each time such step is performed.

Figure 4:
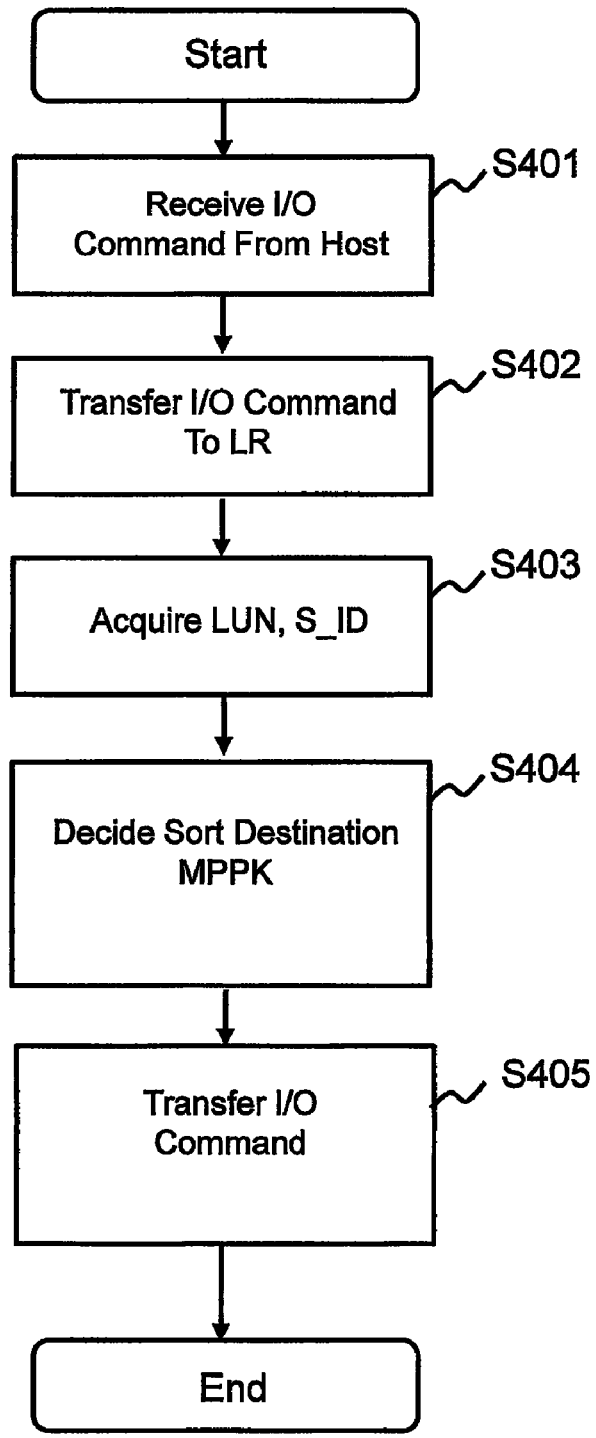
FIG. 4 is a flowchart showing the flow of I/O command sort processing.

FIG. 4 is a flowchart showing the flow of I/O command sort processing. FIG. 5 shows a sort destination search table.

The protocol chip 211 in the CHA 210 receives an I/O command via the port 213 (step 401). Subsequently, the I/O command is transferred from the protocol chip 211 to the LR 212 (step 402). The LR 212 acquires a LUN (Logical Unit Number) and an S_ID from that I/O command (step 403). The LUN is the number of the LDEV designated by the host 20. The S_ID is the ID of the host 20. In other words, if the S_ID is analyzed, it is possible to know from which host 20 the I/O command was sent.

Subsequently, the LR 212 refers to the sort destination search table 500 shown in FIG. 5, and decides the sort destination MPPK of the I/O command (step 404). The table 500 includes information representing what kind of I/O command should be sorted to which MPPK. The table 500 may be stored in the SM 241, or stored in the storage area of the respective CHAS 210. Specifically, for example, the table 500 includes the following information for each port 213:

(*) a port number 504 as the number of the port 213 that received the I/O command;
(*) an S_ID 501 as the ID of the host of the source of the I/O command;
(*) a LUN 502 as the number of the LDEV that is designated in the I/O command; and
(*) an MPPK number 503 as the number of the MPPK of the sort destination of the I/O command.

According to FIG. 5, for example, the source of the I/O command that was received by the port #0 is the host 20 of S_ID "0.0.1," and, if the LUN that is designated in that I/O command is "0", the MPPK #0 is decided as the sort destination of that I/O command.

The LR 212 sorts the I/O command to the decided sort destination MPPK 260 (step 405). This I/O command is stored in an entry in the MPPK 260 of the sort destination, and that entry is enqueued to the IMQ 262.

Figure 6:
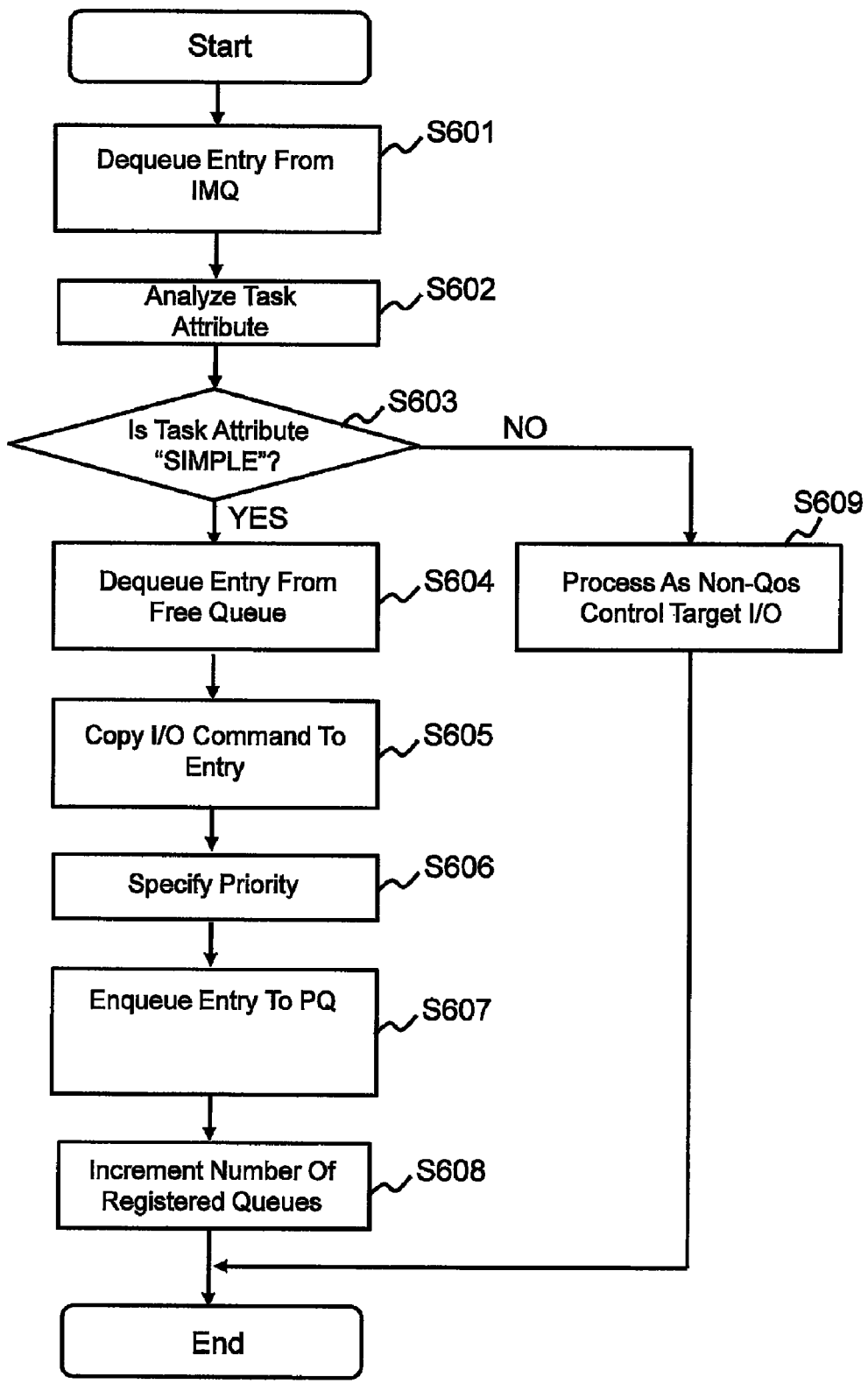
FIG. 6 is a flowchart showing the processing flow of repositioning the entry storing the I/O commands from the IMQ to the PQ.

FIG. 6 is a flowchart showing the processing flow of repositioning the entry storing the I/O commands from the IMQ to the PQ.

An arbitrary MP 264 in the MPPK 260 dequeues an entry from the IMQ 262 (step 601), and analyzes the Task Attribute that is given to the I/O command in that entry (step 602). Here, the Task Attribute is information according to the SCSI (Small Computer System Interface) standard, and is information representing whether it is an I/O command to be controlled by the Qos control unit 10. If the Task Attribute of the I/O command is a value of "SIMPLE," that I/O command is an I/O command that should be controlled by the Qos control unit 10.

If the Task Attribute is a value of "SIMPLE" (step 603: YES), the MP 264 dequeues an entry from the free queue in the local memory 261 (step 604). Subsequently, the MP 264 copies the I/O command in the entry that was dequeued at step 601 to the entry that was dequeued at step 604 (step 605). The MP 264 specifies the priority "n" that is given to the copied I/O command (step 606). The MP 264 enqueues the entry that was dequeued at step 604 (entry storing the I/O command) to the PQ 263 corresponding to the specified priority "n" (step 607). Subsequently, the MP 264 increments by one the number of registered queues regarding the PQ 263 corresponding to the priority "n" (step 608). Here, the "number of registered queues" of the PQ 263 is the total number of I/O commands stored in that PQ; that is, the number of entries configuring that PQ 263. The reason why the number of registered queues is incremented is because the total number of I/O commands that can be processed for each PQ 263 is decided in advance, and it is necessary to recognize the maximum number of I/O commands that can be processed by the MP 264 and the Qos main control unit 10. Information representing the number of registered queues (total number of I/O commands) of each PQ 263 is collected in the SVP 220, and sent (fed back) from the SVP 220 to the Qos control unit 10.

If the Task Attribute is not a value of "SIMPLE" (S603: NO), the MP 264 processes the I/O command in the entry that was dequeued at step 601 as a non-Qos control processing I/O command (S609). For example, the MP 264 runs the I/O command in the entry that was dequeued at step 601.

The processing flow of the I/O commands stored in the entry in the PQ 263 is now explained.

In this embodiment, the maximum number of I/O commands that can be run in each given period of time (every minute, for example) for each PQ 263 (hereinafter referred to as the "maximum number of runnable commands") is decided in advance.

Figure 7:
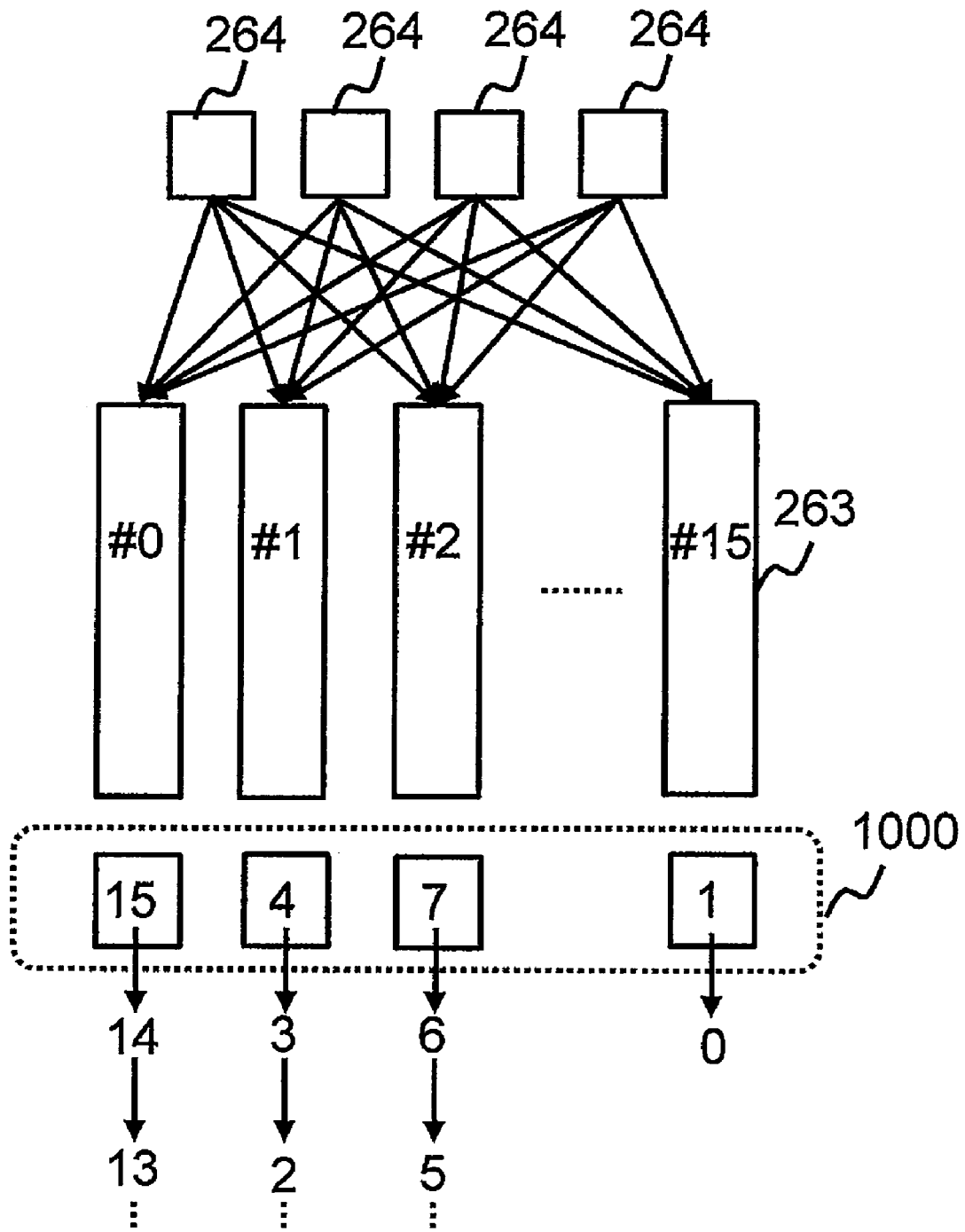
FIG. 7 is a schematic diagram of the command run control processing based on the maximum number of runnable commands of each PQ 263.

FIG. 7 is a schematic diagram of the command run control processing based on the maximum number of runnable commands for each PQ 263.

According to the example shown in FIG. 7, four MPs 264 exist in the MPPK 260, and sixteen PQs 263 respectively corresponding to the priorities in sixteen stages in the local memory 261. The dotted frame 1000 represents the maximum number of runnable commands corresponding to each PQ 263. According to FIG. 7, the maximum number of runnable commands of the PQ #0 is "15", the maximum number of runnable commands of the PQ #1 is "4", the maximum number of runnable commands of the PQ #2 is "7", and the maximum number of runnable commands of the PQ #15 is "1". Note that the maximum number of runnable commands is decided based on the share value and concurrency value described later. The MP 264 to run the I/O commands is switched in a round robin.

For example, a maximum of fifteen I/O commands are run within a given period of time from the PQ #0 in which the maximum number of runnable commands is "15". Each time an I/O command is run, the maximum number of runnable commands is decremented, and the I/O commands are run from the PQ #0 until this becomes 0.

Moreover, for example, when one I/O command is run within a given period of time from the PQ #15 in which the maximum number of runnable commands is "1", the maximum number of runnable commands becomes "0". Thus, an I/O command is not run from the PQ #15 within that given period of time when maximum number of runnable commands has become "0".

As described above, the I/O commands are run until the maximum number of runnable commands of the respective PQs 263 becomes "0". Processing for newly deciding the maximum number of runnable commands is performed for the PQ in which the maximum number of runnable commands has become "0" (PQ in which the I/O commands corresponding to the maximum number of runnable commands have been run), and the decided maximum number of runnable commands is set. The newly set maximum number of runnable commands may be the same as or different from the immediately preceding maximum number of runnable commands.

FIG. 8 shows a queue management table.

The queue management table 900 exists, for example, for each MPPK 260, and is stored in the local memory 261. Note that a table in which a plurality of queues management tables corresponding to all MPPKs are merged may also be stored in the SM 241.

The queue management table 900 includes a number of registered queues 901, a number of running commands 902, and a maximum number of runnable commands 903 for each PQ 263 in the MPPK 260 comprising the table 900. The number of registered queues 901 is information representing the total number of I/O commands that is registered in the PQ 263 (number of entries configuring the PQ 263). The number of running commands 902 is information representing the number of I/O commands that are currently being run from the PQ 263. The maximum number of runnable commands 903 is information representing the total number of I/O commands that can be run.

A PQ 263 with a greater maximum number of runnable commands 903 is able to process more I/O commands in a given period of time. When an MP 264 runs an I/O command, the maximum number of runnable commands 903 corresponding to the PQ 263 storing that I/O command is decremented by one.

Even PQs corresponding to the same priority may have a different maximum number of runnable commands depending on in which MPPK such PQ is included.

Figure 9:
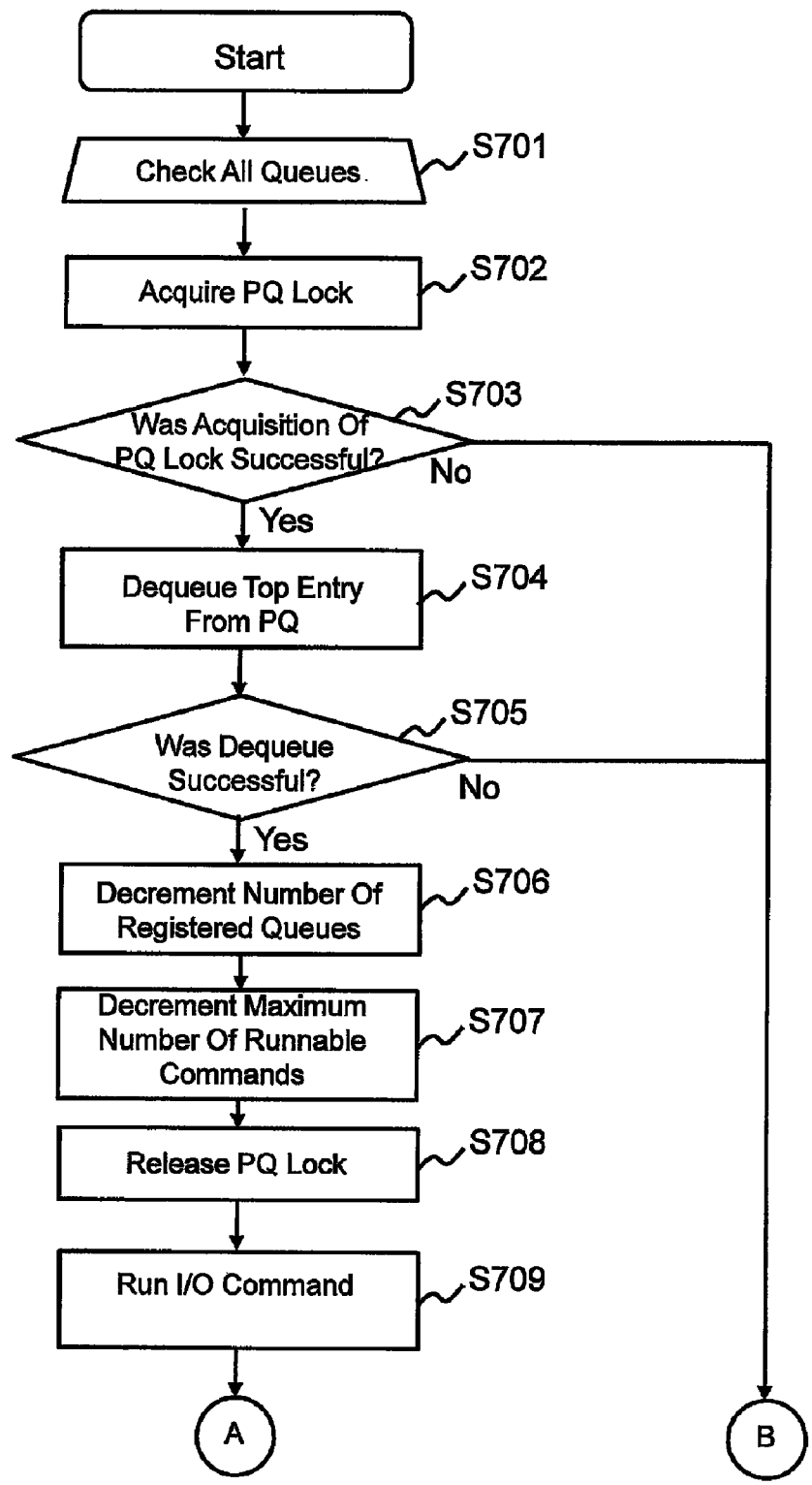
FIG. 9 is a flowchart showing a part of the command run control processing.
Figure 10:
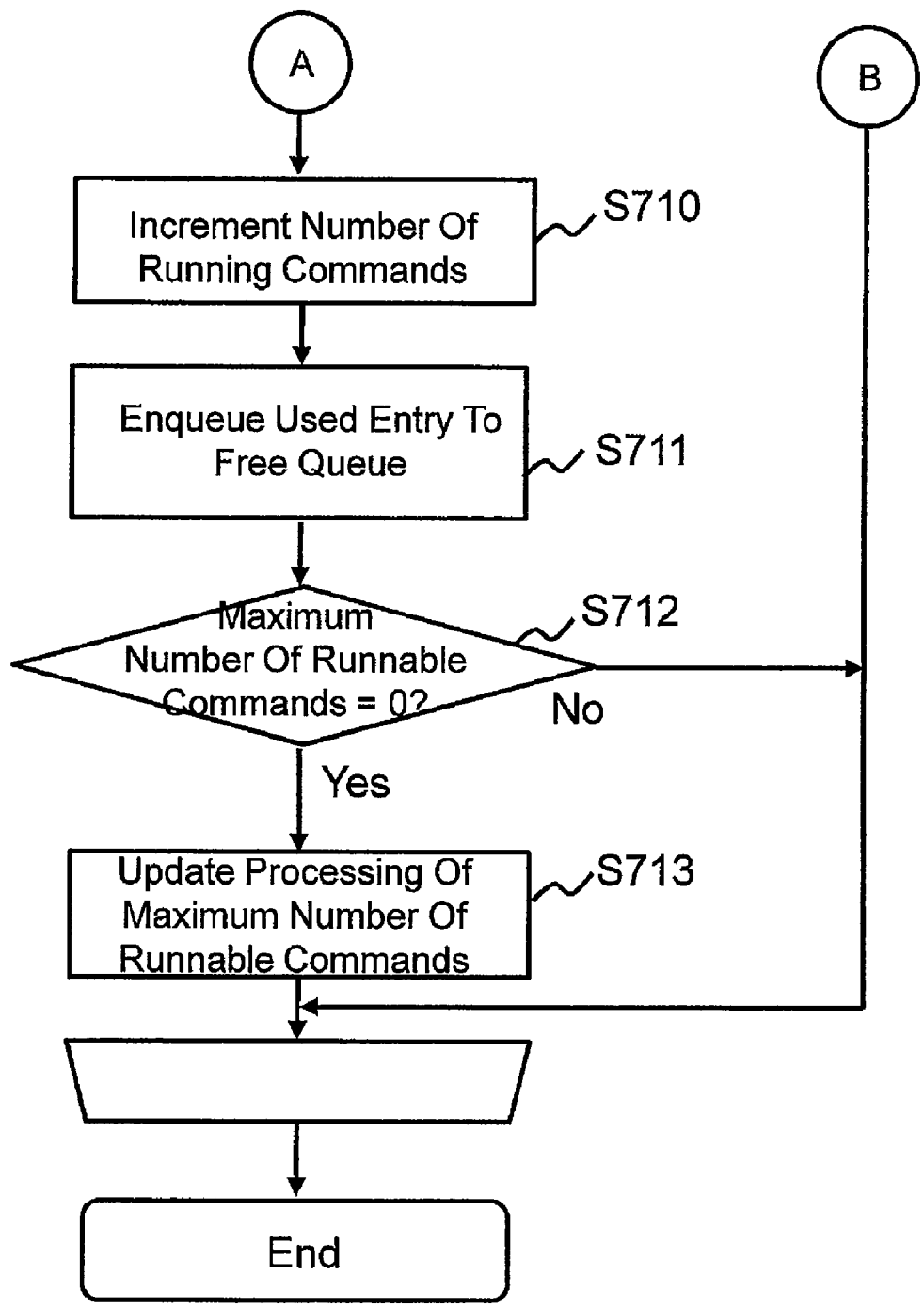
FIG. 10 is a flowchart showing the remainder of the command run control processing.

FIG. 9 and FIG. 10 are flowcharts showing the command run control processing. Specifically, FIG. 9 is a flowchart showing a part of the command run control processing, and FIG. 10 is a flowchart showing the remainder of the command run control processing. The command run control processing is now explained taking one MP 264 as an example (in the explanation of FIG. 9 to FIG. 19, this will be referred to as the "target MP 264").

The target MP 264 checks all PQs 263 in a round robin (step 701). Step 702 onward are now explained taking one PQ 263 as an example (in the explanation of FIG. 9 and FIG. 10, this will be referred to as the "target PQ 263").

The target MP 264 acquires a PQ lock of the target PQ 263 (step 702). The "PQ lock" is a lock for excluding the other MPs 264 from the target PQ 263. If the target MP 264 is unable to acquire the PQ lock of the target PQ 263, it means that the target PQ 263 is being locked by another MP 264. In the foregoing case (step 703: NO), the target MP 264 performs S702 to a different PQ.

If it is possible to acquire the PQ lock, the target MP 264 dequeues the top entry from the target PQ 263 (step 704). If the dequeue is successful (step 705: YES), the target MP 264 decrements by one the number of registered queues 901 (refer to FIG. 8) corresponding to the target PQ 263 (step 706). Moreover, the target MP 264 decrements by one the maximum number of runnable commands 903 corresponding to the target PQ 263 (step 707). Subsequently, the target MP 264 releases the acquired PQ lock (step 708). The target MP 264 then runs the I/O command in the dequeued entry (step 709). The target MP 264 increments by one the number of running commands 902 corresponding to the target PQ 263 (step 710). The target MP 264 enqueues the entry that was dequeued from the target PQ 263 to the free queue (step 711).

The target MP 264 checks whether every maximum number of runnable commands 903 corresponding to all PQs 263 is zero (step 712). If every maximum number of runnable commands 903 is zero (step 712: YES), the target MP 264 performs processing for updating every maximum number of runnable commands 903 (step 713).

The flow of the command run control processing is not limited to the foregoing flow. For example, if the MP 264 acquires a PQ lock regarding one PQ, that MP 264 may check the other PQs until another MP 264 acquires a PQ lock without checking the other PQs. In other words, each MP 264 may run one I/O command only for the PQ in which the PQ lock was acquired.

The update processing of the maximum number of runnable commands is now explained. This update processing uses the share value and the concurrency value.

Here, the "share value" is a parameter existing for each PQ 263. At the start of the update processing of the maximum number of runnable commands, it is added to the area provided to each PQ 263. The MP 264 controls the number of I/O commands to be run and the order of running such I/O commands so that the job running ratio of the PQ 263 becomes the ratio of the share value corresponding to that PQ 263.

The "concurrency value" is the upper limit value of the maximum number of runnable commands of each PQ 263. The MP 264 limits the maximum number of runnable commands of the I/O commands so that it will be equal to or less than the concurrency value. It is thereby possible to prevent a delay in the running of a high priority I/O command.

Figure 11:
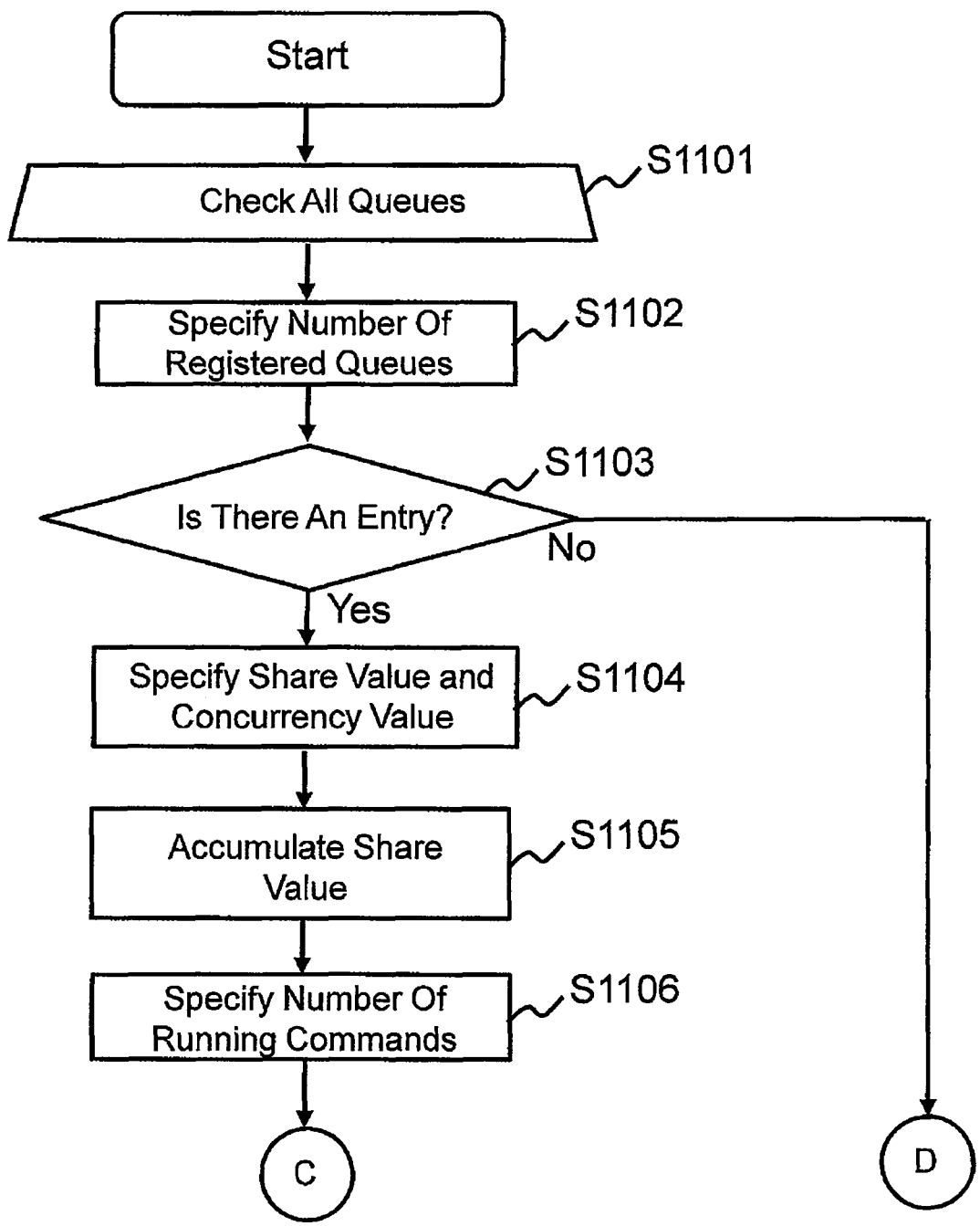
FIG. 11 is a flowchart showing a part of the update processing of the maximum number of runnable commands.
Figure 12:
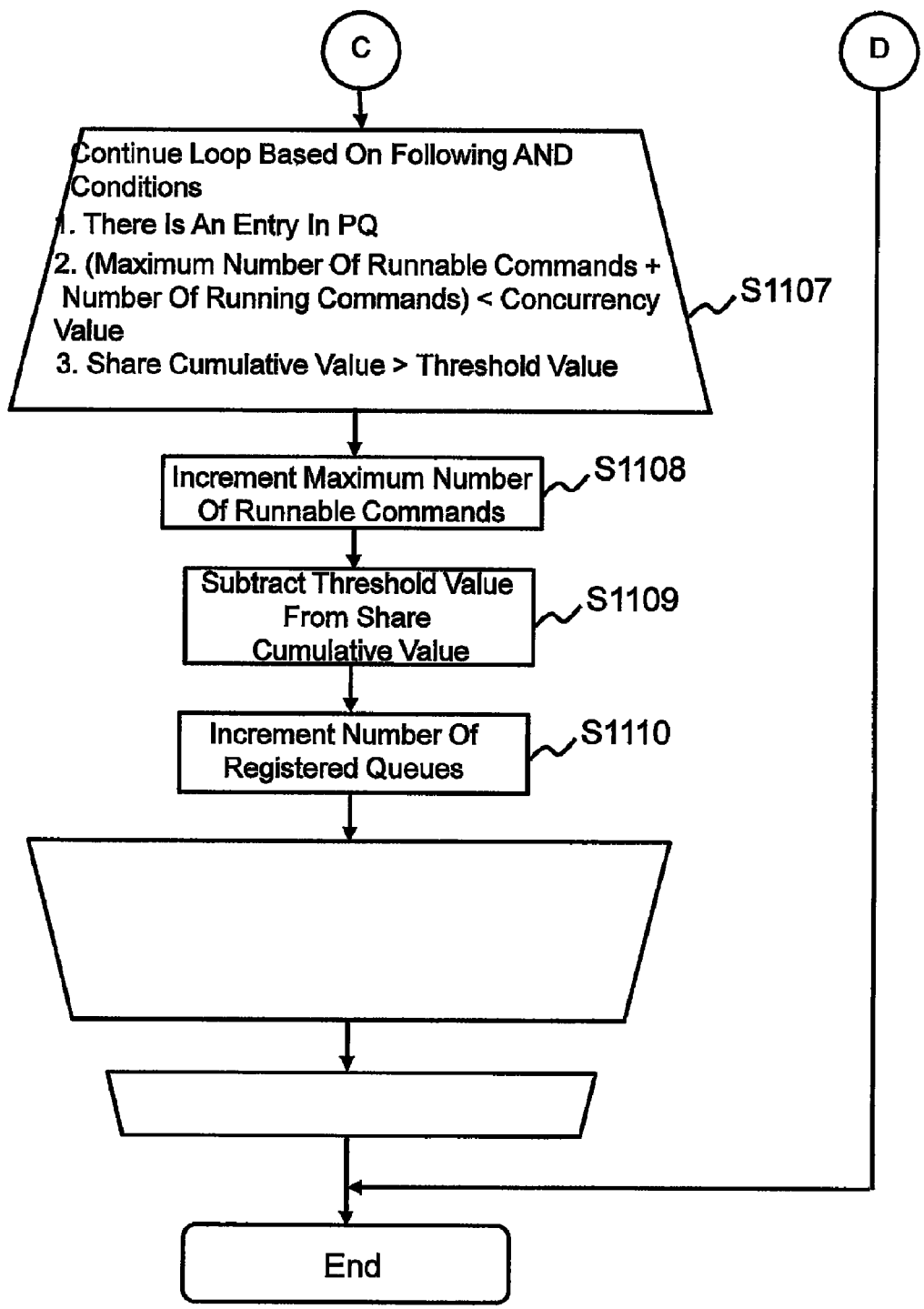
FIG. 12 is a flowchart showing the remainder of the update processing of the maximum number of runnable commands.

FIG. 11 and FIG. 12 are flowcharts of the update processing of the maximum number of runnable commands. Specifically, FIG. 11 is a flowchart showing a part of the update processing of the maximum number of runnable commands, and FIG. 12 is a flowchart showing the remainder of the update processing of the maximum number of runnable commands.

The target MP 264 checks all PQs 263 in a round robin (step 1101). The target MP 264 specifies the number of registered queues 901 of each PQ 263. Here, the process of the MP 263 checking all PQs 263 is referred to as "one round." In one round, step 1102 onward are performed regarding all PQs 263. Step 1102 onward are now explained taking one PQ 263 as an example (in the explanation of FIG. 11 and FIG. 12, this will be referred to as the "target PQ 263").

The target MP 264 specifies the number of registered queues 901 corresponding to the target PQ 263 (step 1102). The target MP 264 checks whether there is an entry in the target PQ 263 (step 1103). If there is an entry (step 1103: YES), the target MP 264 specifies the share value and the concurrency value of the target PQ 263 (step 1104). Subsequently, the target MP 264 accumulates the share value that was specified at step 1104 in the remaining share cumulative value (described later) corresponding to the target PQ 263 (step 1105).

The target MP 264 specifies the number of running commands 902 of the target PQ 263 (step 1106).

Subsequently, the target MP 264 checks whether all of the following three conditions are satisfied (step 1107):

(*) there is an entry in the target PQ 263;

(*) (the maximum number of runnable commands+the number of running commands)<the concurrency value; and (*) the share cumulative value exceeds a threshold value.

If the foregoing conditions are satisfied, the target MP 264 performs step 1108 onward. Step 1108 onward are repeated regarding the target PQ until at least one condition among the foregoing three conditions is not satisfied.

The target MP 264 increments by one the maximum number of runnable commands 903 (step 1108). Subsequently, the target MP 264 subtracts the threshold value from the share cumulative value (step 1109). The target MP 264 decrements by one the number of registered queues 901 (step 1110).

In the repetition of steps 1108 to 1110, the share cumulative value after the subtraction that became equal to or less than the threshold value is the "remaining share cumulative value" regarding the target PQ.

Moreover, the maximum number of runnable commands at the point in time that the loop of steps 1108 to 1110 is complete is the maximum number of I/O commands that can be run within the subsequent given period of time.

According to the foregoing update processing of the maximum number of runnable commands, the maximum number of runnable commands corresponding to the subsequent given period of time is controlled according to the size of the remaining share cumulative value. In other words, the maximum number of runnable commands will not necessarily be the same in every given period of time regarding one PQ.

The command run control processing (and the update processing of the maximum number of runnable commands) is now explained with reference to FIG. 13 to FIG. 19. For the sake of simplification, let it be assumed that the target MP 264 has three PQs; namely, the PQ #0 with the highest priority, the PQ #1 with the second highest priority, and the PQ #2 with the third highest priority.

Figure 13:
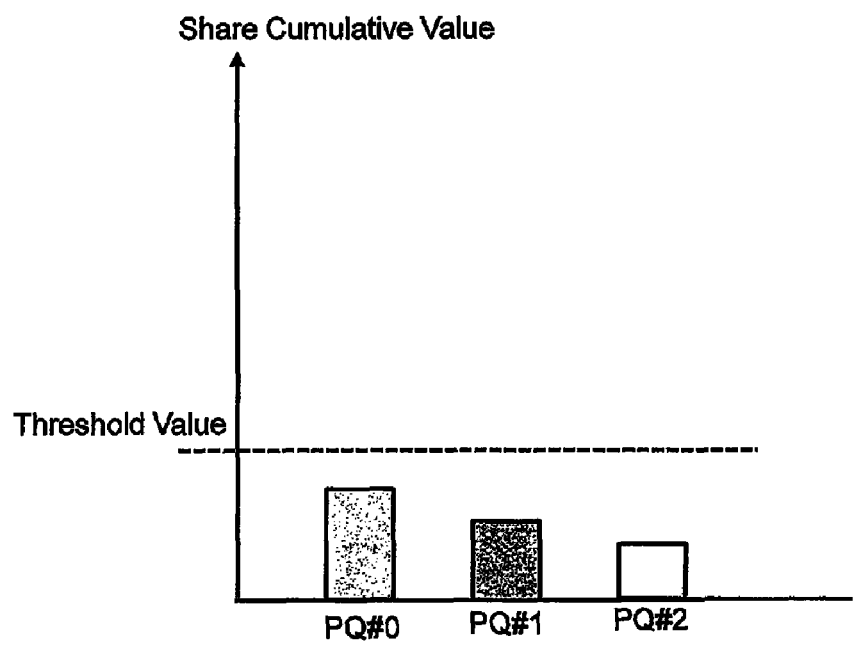
FIG. 13 is a graph showing the immediately preceding remaining share cumulative value of the PQs #0 to #2.

At the point in time that the (n−1)th round is complete, let it be assumed that the remaining share cumulative values of the PQs #0 to #2 are as shown in FIG. 13. The remaining share cumulative value shown in FIG. 13 is used as the nth round.

Figure 14:
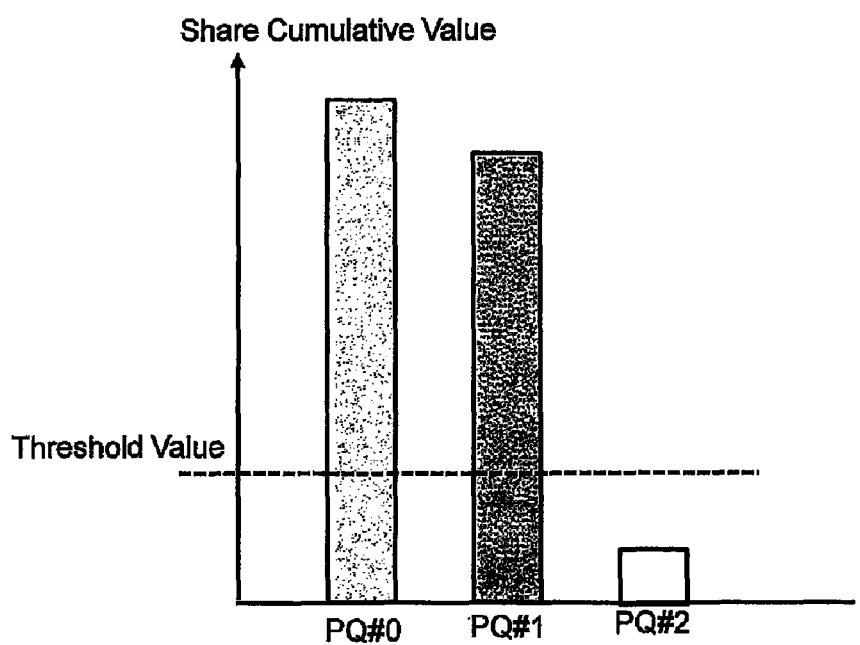
FIG. 14 is a graph showing the current share cumulative value of the PQs #0 to #2.

In the nth round, the target MP 264 accumulates the share values of the PQs #0 to #2 in the remaining share cumulative value as shown in FIG. 14 (step 1105 of FIG. 11). According to FIG. 14, the share value may be a value that is greater as the priority is higher (in other words, the size of the share value may correspond to the level of priority). Moreover, the threshold value is a value that is common to the PQs #0 to #2.

The threshold value is subtracted one or more times from the share cumulative value shown in FIG. 14 regarding the PQs #0 to #2 until threshold value becomes equal to or less than the share cumulative value. Each time the threshold value is subtracted once, the maximum number of runnable commands is incremented by one. Accordingly, the maximum number of runnable commands is a product that is obtained by dividing the share cumulative value shown in FIG. 14 by the threshold value, and the remaining share cumulative value is the remainder thereof. According to FIG. 15, in the nth round, the maximum number of runnable commands regarding the PQ #0 is "3", the maximum number of runnable commands regarding the PQ #1 is "2", and the maximum number of runnable commands regarding the PQ #2 is "0". According to the example of FIG. 15, the remaining share cumulative value at the point in time that the nth round is complete regarding the PQs #0 to #2 is as shown in FIG. 16.

Figures 17, 18:
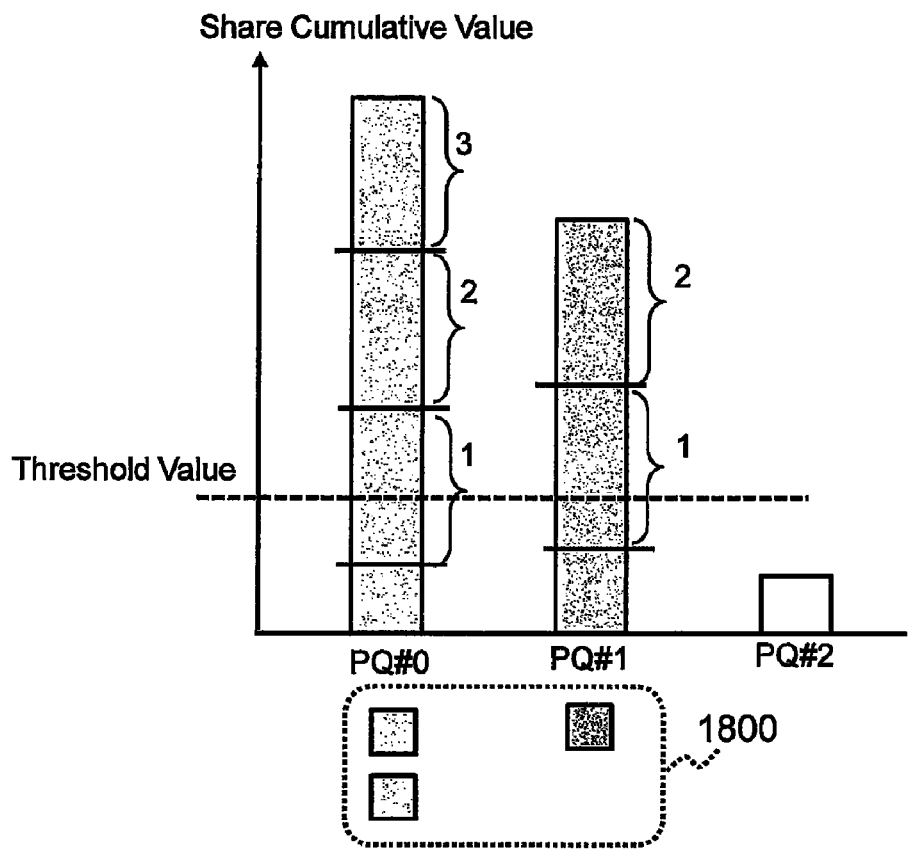
FIG. 17 shows a table representing the concurrency value of each PQ.
FIG. 18 is a graph showing the relation of the current share cumulative value of the PQs #0 to #2 and the number of running commands.

FIG. 17 shows a table representing the concurrency value regarding the PQs #0 to #2. According to the example shown in FIG. 17, the concurrency value of the PQ #0 is "5", the concurrency value of the PQ #1 is "2", and the concurrency value of the PQ #2 is "1".

Figure 15:
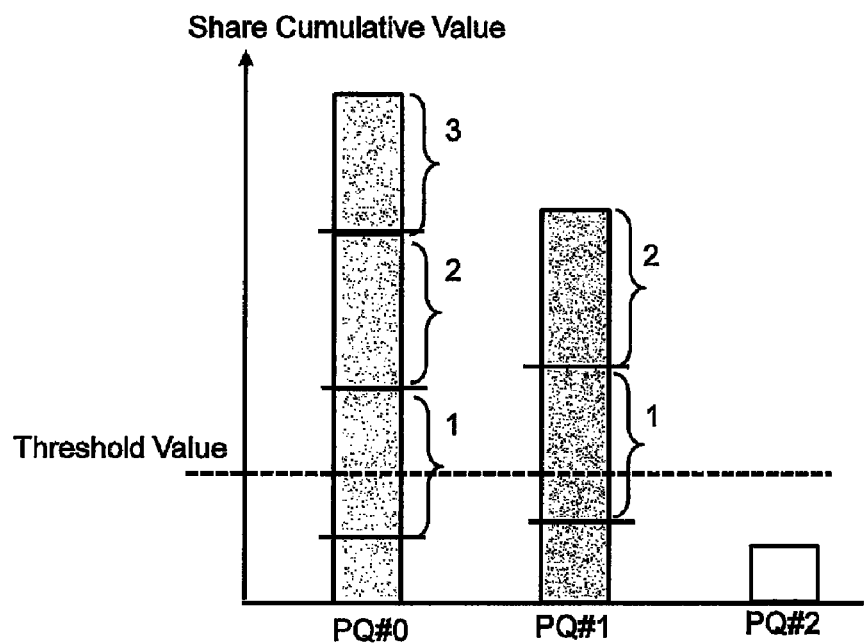
FIG. 15 is a graph showing the relation of the current share cumulative value of the PQs #0 to #2 and the threshold value.
Figure 16:
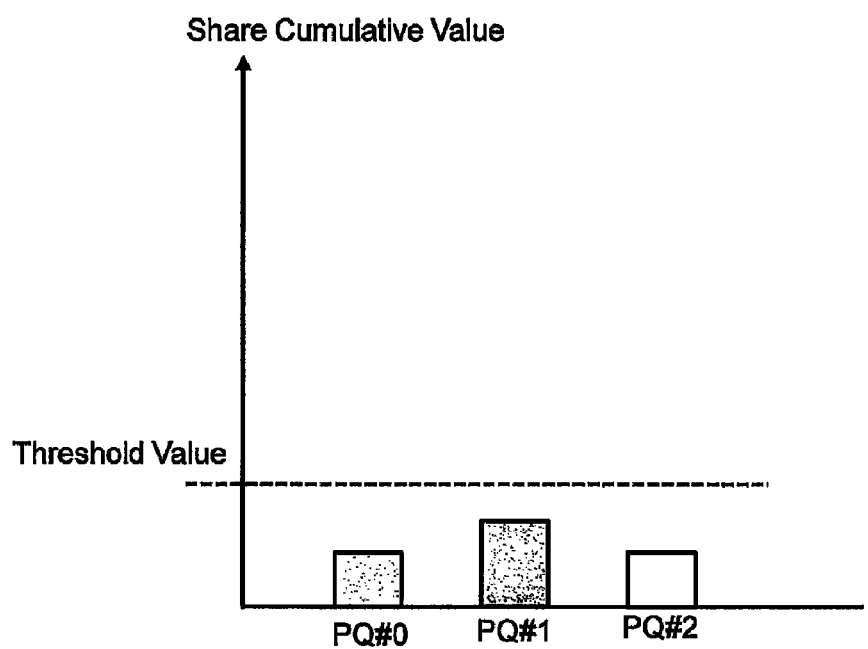
FIG. 16 is a graph showing the current remaining share cumulative value of the PQs #0 to #2.
Figure 19:
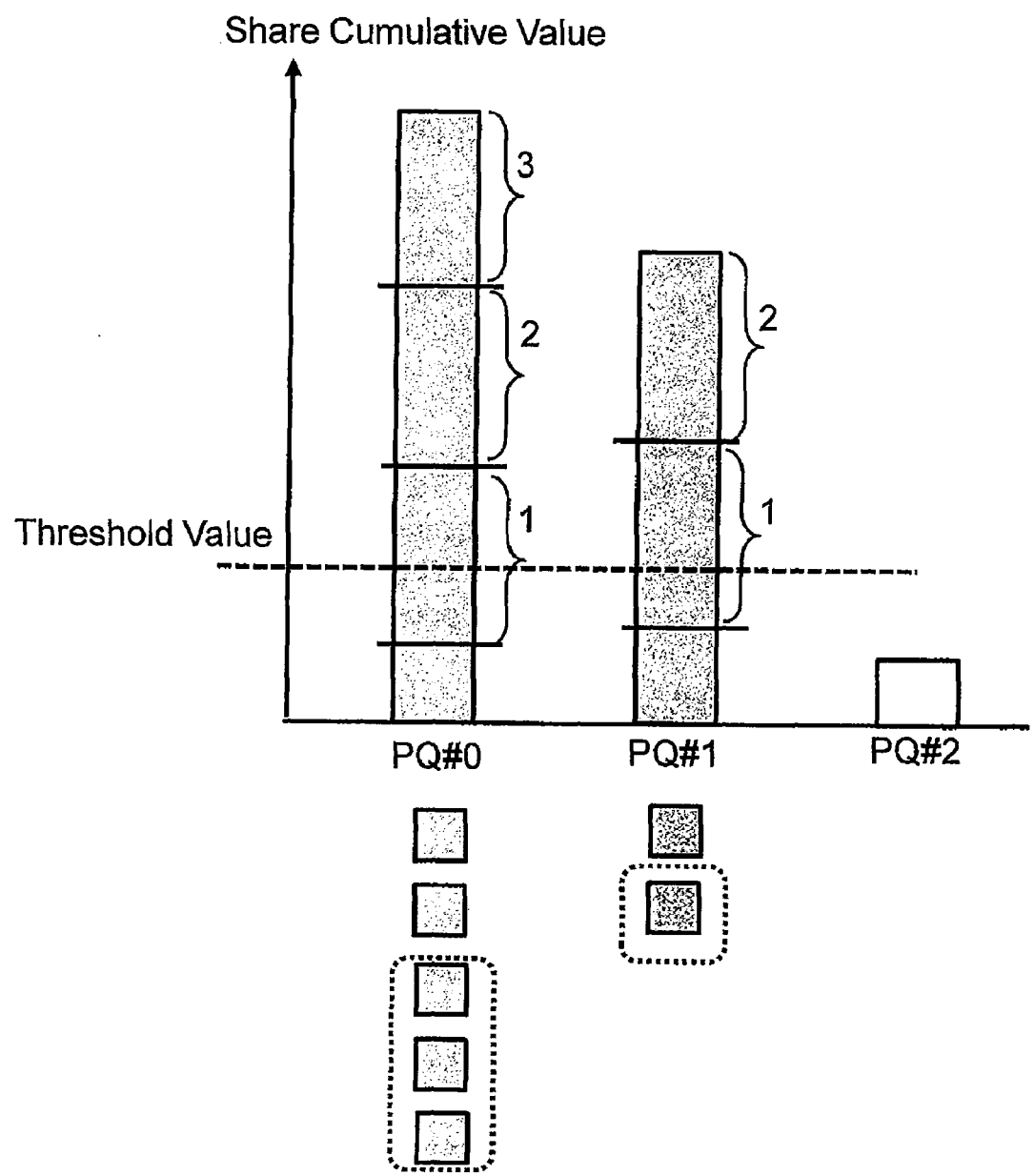
FIG. 19 shows the current maximum number of runnable commands regarding the PQs #0 to #2.

On the basis of the share cumulative value shown in FIG. 15 and the concurrency value shown in FIG. 17 and the number of running command shown in FIG. 18, the maximum number of runnable commands regarding the PQs #0 to #2 will be as shown in FIG. 19 (the dotted frame 1800 of FIG. 18 shows the number of running commands in the PQs #0 to #2).

For example, the same number of I/O commands as "3", which is the product obtained by dividing the share cumulative value by the threshold value, can be run regarding the PQ #0. Specifically, two I/O commands are currently running regarding the PQ #0. The concurrency value of the PQ #0 is "5". Thus, the maximum value of the maximum number of runnable commands of the PQ #0 is "3" (5−2=3). According to FIG. 19, the product that is obtained by dividing the share cumulative value by the threshold value regarding the PQ #0 is "3". Accordingly, the same number of I/O commands as the product "3" can be run regarding the PQ #0.

Nevertheless, the same number of I/O commands as the product "2" cannot be run regarding the PQ #1, and the number of I/O commands that can be run is less than the product "2". Specifically, one I/O command is currently running regarding the PQ #1. The concurrency value of the PQ #1 is "2". Thus, the maximum value of the maximum number of runnable commands of the PQ #1 is "1" (2−1=1). Nevertheless, according to FIG. 19, the product obtained by dividing the share cumulative value by the threshold value regarding the PQ #1 is "2". Accordingly, the maximum number of runnable commands regarding the PQ #1 will be "1".

As described above, the total of the number of running commands and the maximum number of runnable commands is restricted to be a numerical value that is equal to or less than the concurrency value.

FIG. 20 shows a table representing the types of operational status information to be fed back to the Qos main control unit 10.

The Qos main control unit 10 decides the priority to be given to the I/O command and the share value based on the operational status information that was fed back.

According to FIG. 20, there are six types of operational status information to be fed back to the Qos main control unit 10. The following three items are defined for the various types of operational status information:

(*) unit of measure in the MPPK (for what kind of element the operational status information is to be acquired);
(*) unit of acquisition (at what kind of timing the operational status information is to be acquired); and
(*) unit of SM update (at what kind of timing the acquired operational status information is to be stored in the SM 241).

The operational status information #1 is the I/O processing count, the operational status information #2 is the data traffic, the operational status information #3 is the average response time, the operational status information #4 is the number of registered queues, the operational status information #5 is the number of running commands, and the operational status information #6 is the information update count value. The information #1 to #5 are cumulative values, and therefore the Qos main control unit 10 will receive cumulative values. Thus, the Qos main control unit 10 needs to subtract the previously acquired cumulative value from the currently acquired cumulative value in order to calculate the value per unit time, and divide the obtained value by the unit time.

Figure 21:
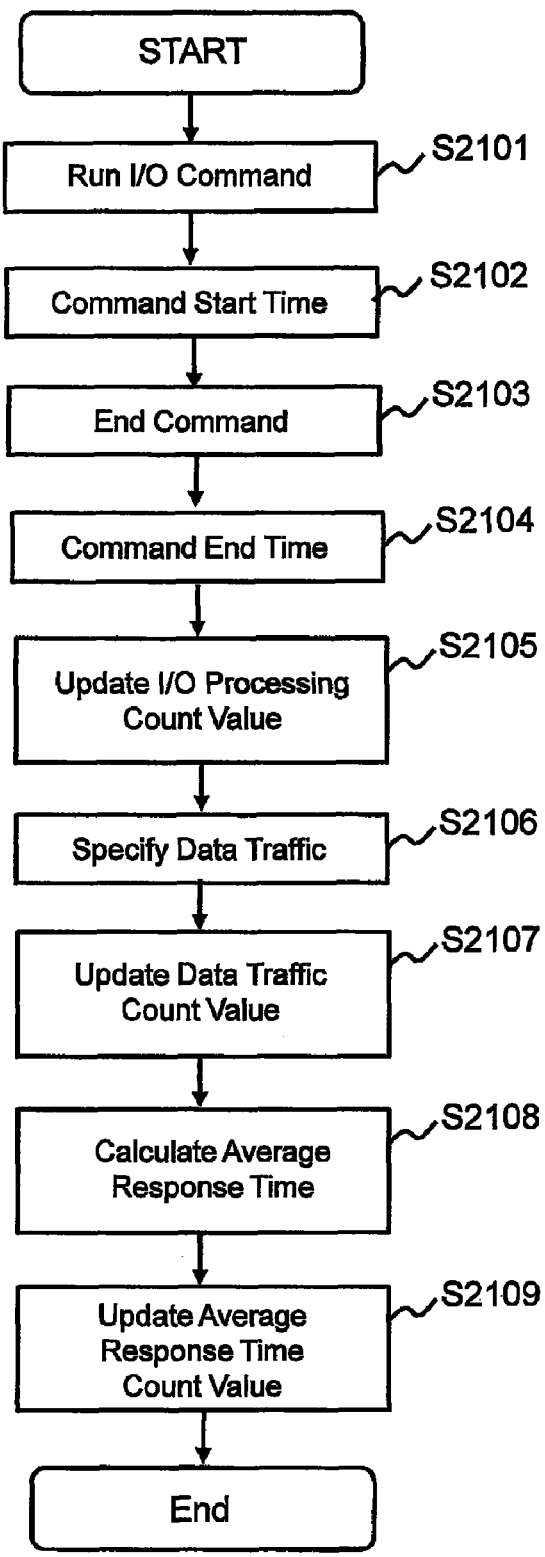
FIG. 21 is a flowchart showing the processing flow of acquiring operational status information (I/O processing count, data traffic, average response time) in which the unit of acquisition is "each completion of I/O processing."

FIG. 21 is a flowchart showing the processing flow of acquiring operational status information (I/O processing count, data traffic, average response time) in which the unit of acquisition is "each completion of I/O processing."

When the MP 264 runs an I/O command (step 2101), it registers the I/O command start time in the local memory 261 (step 2102). Subsequently, when the processing of the I/O command is complete (step 2103), the MP 264 registers the I/O command end time in the local memory 261 (step 2104). The MP 264 thereafter increments by one the I/O processing count value in the local memory 261 (value representing the number of I/O commands that were processed) (step 2105).

Moreover, the MP 264 specifies the amount of data (data traffic) that was written or read according to the processing of the I/O command (step 2106), and adds it to the data traffic count value in the local memory 261 (step 2107).

In addition, the MP 264 calculates the average response time based on the difference between the I/O command start time and the I/O command end time (value obtained by dividing the total difference between the I/O command start time and the I/O command end time by the I/O command processing count value) (step 2108), and adds the calculated value to the average response time count value in the local memory 261 (step 2109).

According to the foregoing processing, the I/O processing count value, the data traffic count value, and the average response time count value in the local memory 261 are updated each time an I/O command is processed.

Figure 22:
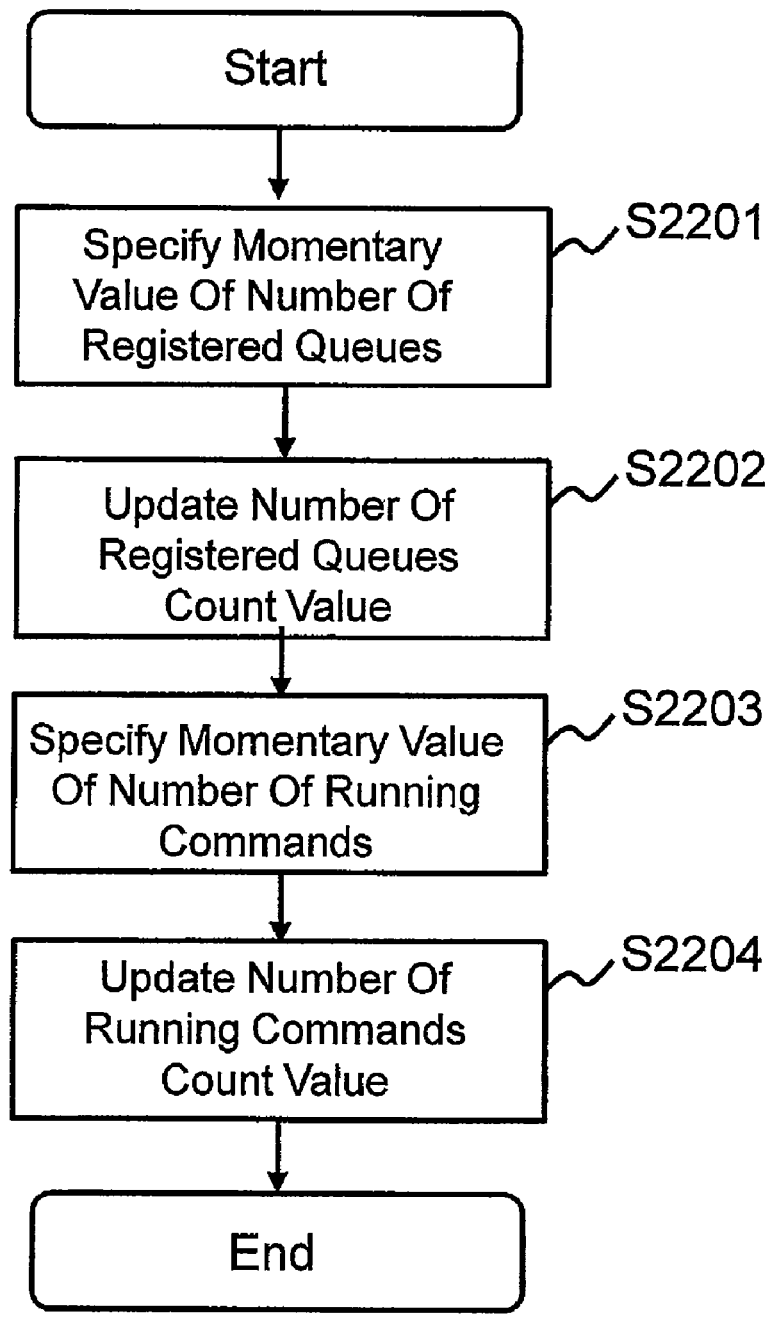
FIG. 22 is a flowchart showing the processing flow of acquiring operational status information (number of registered queues, number of running commands) in which the unit of acquisition is "50 milliseconds (momentary value)."

FIG. 22 is a flowchart showing the processing flow of acquiring operational status information (number of registered queues, number of running commands) in which the unit of acquisition is "50 milliseconds (momentary value)."

The MP 264 specifies the momentary value of the number of registered queues 901 (number of registered queues at such point in time) (step 2201). Subsequently, the MP 264 adds the specified momentary value to the number of registered queues count value in the local memory 261 (step 2202). Here, the "momentary value" is a value that is specified in a short duration of, for example, approximately 50 msec.

Moreover, the MP 264 specifies the momentary value of the number of running commands 902 (step 2203). Subsequently, the MP 264 adds the specified momentary value to the number of running commands count value in the local memory 261 (step 2202). In this case also, the "momentary value" is a value that is specified in a short duration of, for example, approximately 50 milliseconds.

Figure 23:
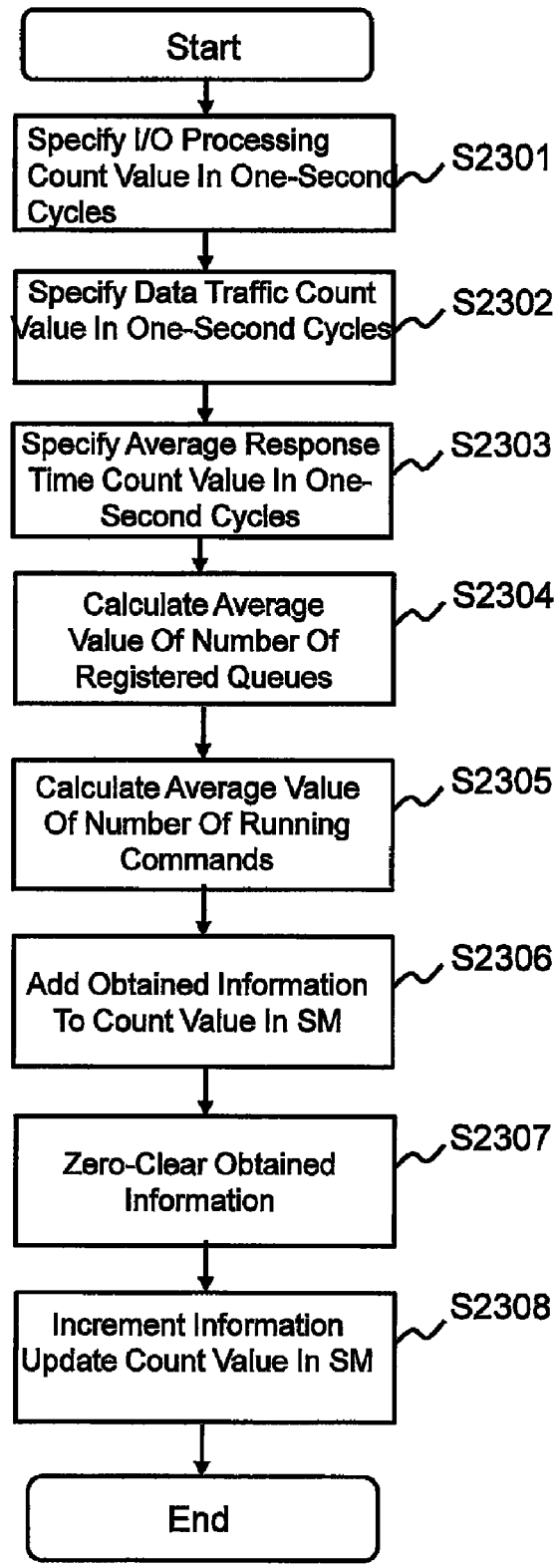
FIG. 23 is a flowchart showing the processing flow of updating operational status information in the SM in which the unit of acquisition is "one second cycle (1 s cycle) (momentary value)."

FIG. 23 is a flowchart showing the processing flow of updating operational status information in the SM in which the unit of acquisition is "one second cycle (1 s cycle) (momentary value)."

The MP 264 performs the following in a one second cycle:
(*) specifies the I/O processing count value in the local memory 261 (cumulative value of the processed I/O commands) (step 2301);
(*) specifies the data traffic count value in the local memory 261 (cumulative value of the amount of data that was input and output) (step 2302); and
(*) specifies the average response time count value in the local memory 261 (cumulative value of the average response time) (step 2303).

The order of step 2301 to step 2303 is not limited to the above.

Subsequently, the MP 264 calculates the average value of the number of registered queues (number of registered queues per second (for example, a value that is obtained by dividing the number of registered queues count value by the information update count value)) based on the number of registered queues count value in the local memory 261 (step 2304).

Moreover, the MP 264 calculates the average value of the number of running commands (number of running commands per second (for example, a value that is obtained by dividing the number of running commands count value by the information update count value)) based on the number of running commands count value in the local memory 261 (step 2305).

The MP 264 adds the various types of operational status information obtained at steps 2301 to 2305 to the corresponding count values in the SM 241 (step 2306), and zero-clears (resets) the various types of operational status information obtained at steps 2301 to 2305 (step 2307). Subsequently, the MP 264 increments by one the information update count value (information #6 of FIG. 20) in the SM 241 (step 2308). In other words, the information update count value is the number of times that the sequential processing shown in FIG. 23 was performed.

The various types of operational status in the SM 241 that were updated are fed back from the MP 264 to the Qos main control unit 10. The various types of operational status information in the SM 241 are sent to the Qos main control unit 10 periodically (or randomly) at a one second cycle or a cycle that is longer than one second.

The Qos main control unit 10 performs control based on the one or more types of operational status information that were fed back. For example, if the load of the first PQ #1 in the first MPPK #0 (number of I/O commands that is accumulated in the PQ #1) is lower than an expected value or higher than the load of the second PQ #1 (PQ of the same priority) in the second MPPK #1, the difference between the load of the first PQ #1 and the load of the second PQ #2 can be expected to be reduced according to one of the following methods (1) to (3):

(1) the Qos main control unit 10 performs control so that the MPPK #0 reduces the frequency of issuing I/O commands designating the LDEV as the ownership, and the MPPK #1 increases the frequency of issuing I/O commands designating the LDEV as the ownership;

(2) the Qos main control unit 10 adjusts the control parameter (for example, the share value and/or the concurrency value) to be set regarding the MPPK #0 and/or #1; or (3) the ownership of the LDEV designated in the I/O command accumulated in the PQ #1 is migrated from the MPPK #0 to the MPPK #1.

Here, the "ownership" is the right to access the target LDEV. For example, if an ownership of a certain LDEV is set regarding a certain MPPK, only the MPPK possessing the ownership of that LDEV can access such certain LDEV, and the other MPPKs without the ownership of that LDEV cannot access the LDEV.

Figure 24:
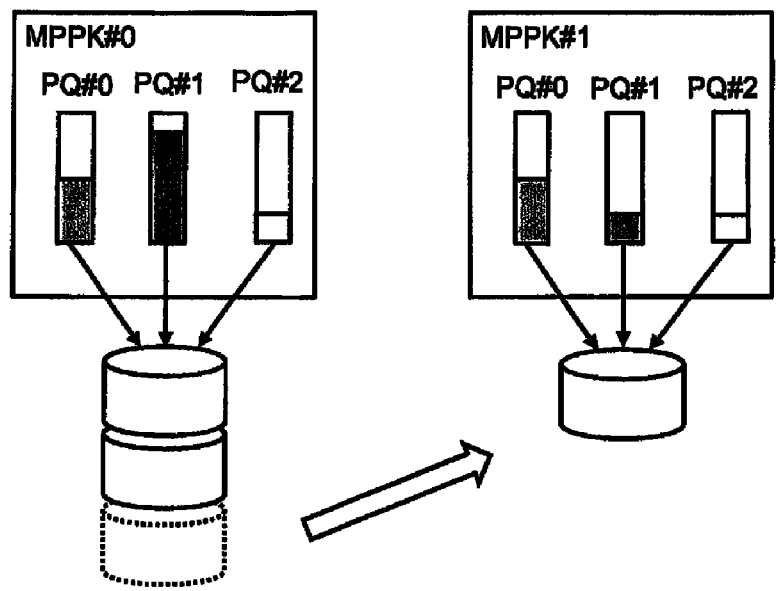
FIG. 24 shows the load of each PQ before the migration of the LDEV ownership.
Figure 25:
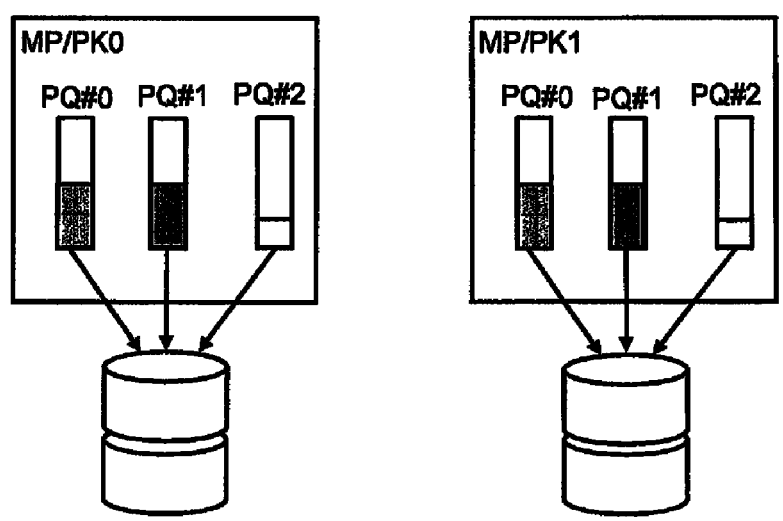
FIG. 25 shows the load of each PQ after the migration of the LDEV ownership.

In method (3) above, the ownership of which LDEV should be migrated from the MPPK #0 to the MPPK #1 can be decided by the Qos main control unit 10 based on the operational status information that was fed back, the administrator may decide the same based on the operational status information, or the MP 264 (or the SVP) may decide the same based on the operational status information. As shown in FIG. 24 and FIG. 25, as a result of the ownership of the decided LDEV being migrated from the MPPK #0 to the MPPK #1, the difference between the load of the first PQ #1 and the load of the second PQ #2 can be reduced. As a result of migration of the ownership of the LDEV, the load can be balanced between the MPPK of the migration source of the ownership and the MPPK of the migration destination of the ownership.

Operational status information may be acquired for each PQ and each MPPK (for example, the I/O frequency (for example, the unit is IOPS (number of I/O commands per second) may be acquired per PQ)), and the PQ with the load with the greatest difference in comparison to the expected load may be selected. In addition, operational status information of each LDEV associated with a PQ (each LDEV that could be designated in the I/O command accumulated in that PQ) may be acquired regarding that PQ, and the ownership (LDEV) may be decided based on such operational status information so that the difference between the load after migrating the ownership (LDEV) and the expected load will become the smallest.

Note that if an ownership of a certain LDEV is migrated from the first MPPK to the second MPPK, the sort destination search table 500 (refer to FIG. 5) is updated. Specifically, the number of the second MPPK is associated with the LUN of a certain LDEV in the table 500 in substitute for the number of the first MPPK.

Meanwhile, the following control is also possible as the Qos control.

Figures 26, 27:
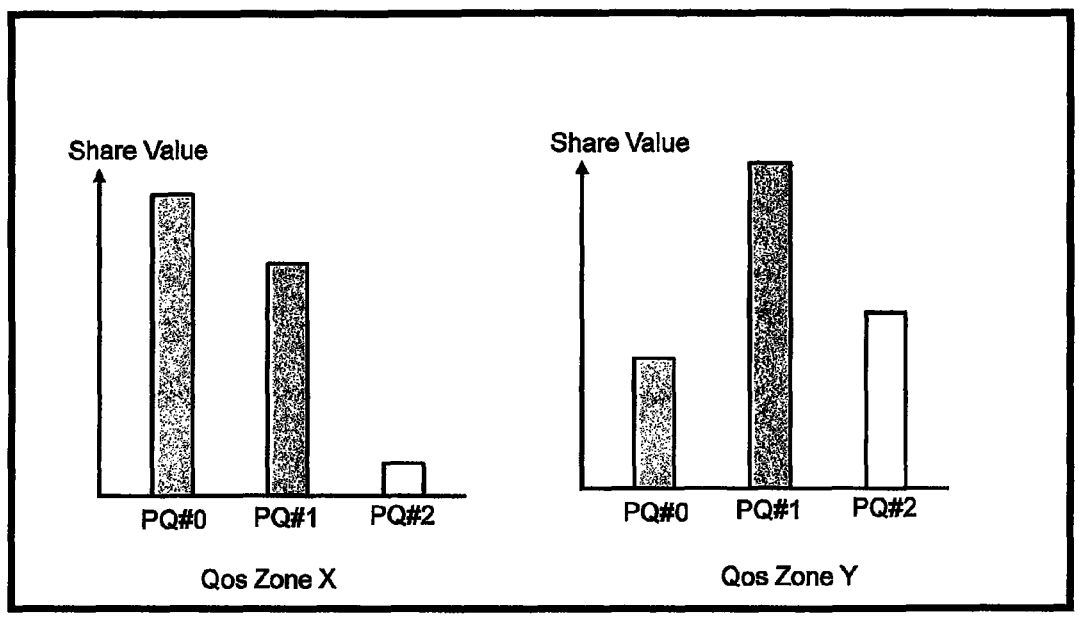
FIG. 26 is a graph showing that the share cumulative value will differ depending on the Qos zone.
FIG. 27 shows a Qos control table.

Specifically, the computer system is logically divided into a plurality of zones (hereinafter referred to as the "Qos zones"). Each Qos zone includes at least one host, at least one MPPK, and at least one LDEV. The Qos main control unit 10 is able to perform Qos control for each Qos zone that is different from the other Qos zones. In other words, independent Qos control may be performed for each Qos zone. Specifically, for example, if the first Qos zone and the second Qos zone respectively have three PQs, the share value and the concurrency value that are set regarding the three PQs in the first Qos zone may differ from the share value and the concurrency value that are set regarding the three PQs in the second Qos zone. For example, as shown in FIG. 26, Qos control may be performed such that the share cumulative value regarding the three PQs in the Qos zone X differs from the share cumulative value regarding the three PQs in the Qos zone Y. Moreover, the Qos main control unit 10 may also perform independent Qos control for each Qos zone based on to which element (for example, MPPK, PQ) belonging to which Qos zone the fed back operational status information relates. More specifically, for example, the Qos main control unit 10 may perform at least one of the following based on the Qos control table shown in FIG. 27:

(*) decide what kind of parameter (share value and/or concurrency value) should be set in the PQ of which Qos zone;

(*) specify regarding to which Qos zone the operational status information relates; or (*) decide the MPPK in which separate Qos zone to which the ownership of the LDEV in which Qos zone should be migrated, and migrate the LDEV ownership between the Qos zones according to such decision.

The Qos control table may include, for example, the following information for each Qos zone:

(*) ID of the Qos zone;

(*) ID (for example, S_ID) of the host included in the Qos zone;

(*) number of the MPPK included in the Qos zone; and (*) ID (for example, LUN) of the LDEV included in the Qos zone.

Migration of the LDEV ownership between the Qos zones can be performed in both the initial configuration of the computer system and the Qos zone change during the operation of the computer system.

Figure 28:
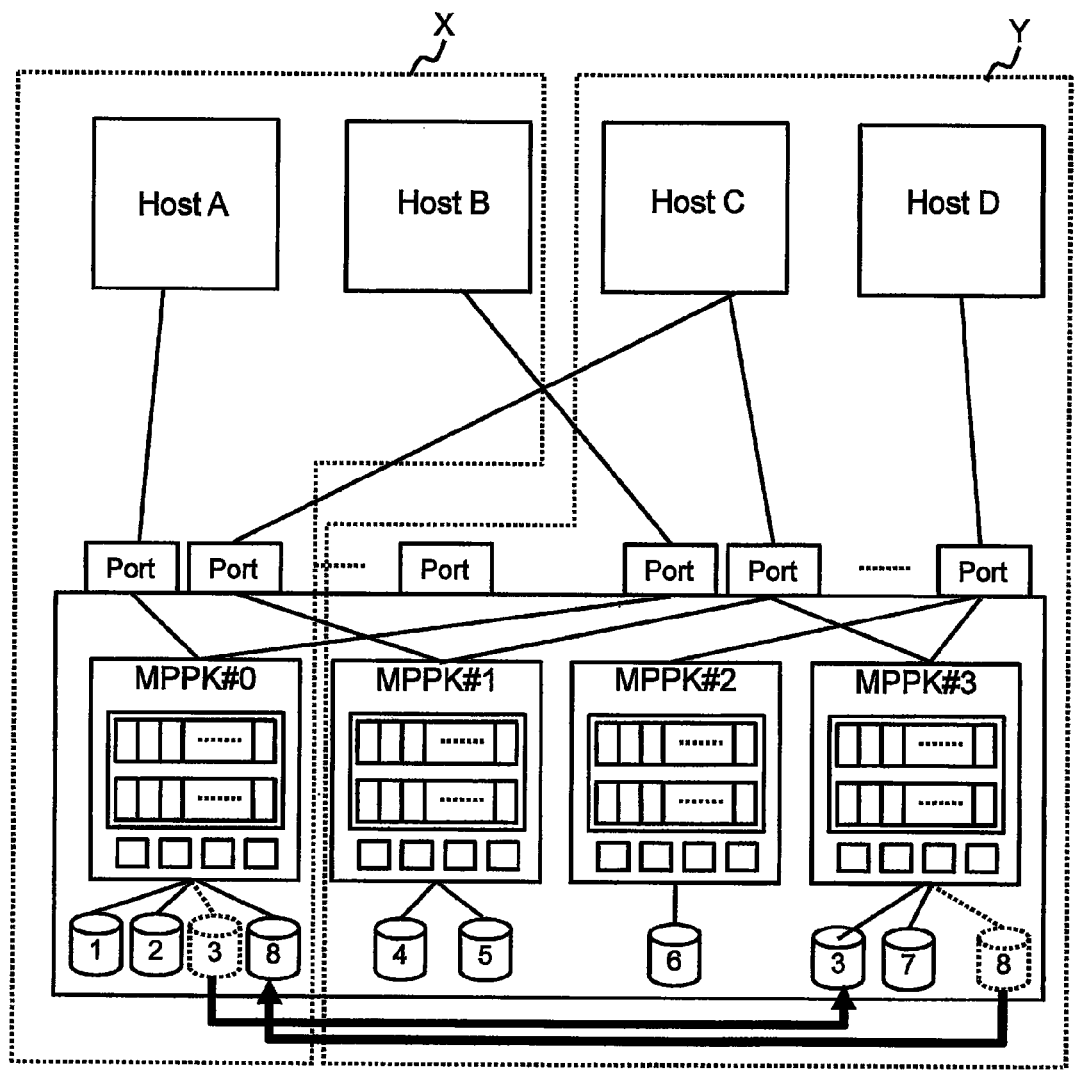
FIG. 28 is a diagram showing an example of the migration of the LDEV ownership in the initial configuration of the computer system.

FIG. 28 is a diagram showing an example of the migration of the LDEV ownership in the initial configuration of the computer system.

There are Qos zones X and Y. The MPPK #0 is included in the Qos zone X, and the MPPK #3 is included in the Qos zone Y. The MPPK #0 possesses the ownership of the LDEVs #1 to #3, and the MPPK #3 possesses the ownership of the LDEVs #7 and #8.

Under these circumstances, let it be assumed that the MP 264 (or the SVP 220) is instructed by the SVP 220 (or the Qos main control unit 10) to include the LDEV #3 in the Qos zone Y and include the LDEV #8 in the Qos zone X.

In the foregoing case, the MP 264 (or the SVP 220) migrates the ownership of the LDEV #3 from the MPPK #0 to one of the MPPKs (for example, the MPPK #3) in the Qos zone Y. Moreover, the MP 264 (or the SVP 220) migrates the ownership of the LDEV #8 from the MPPK #3 to one of the MPPKs (for example, the MPPK #0) in the Qos zone X. The Qos main control unit 10, the SVP 220 or the MP 264 may also decide which MPPK among the one or more MPPKs in the Qos zone of the migration destination should become the migration destination of the ownership based on the parameter (for example, the share value) regarding the PQ to which is accumulated the I/O command designating the LDEV corresponding to the ownership to be migrated.

Figure 29:
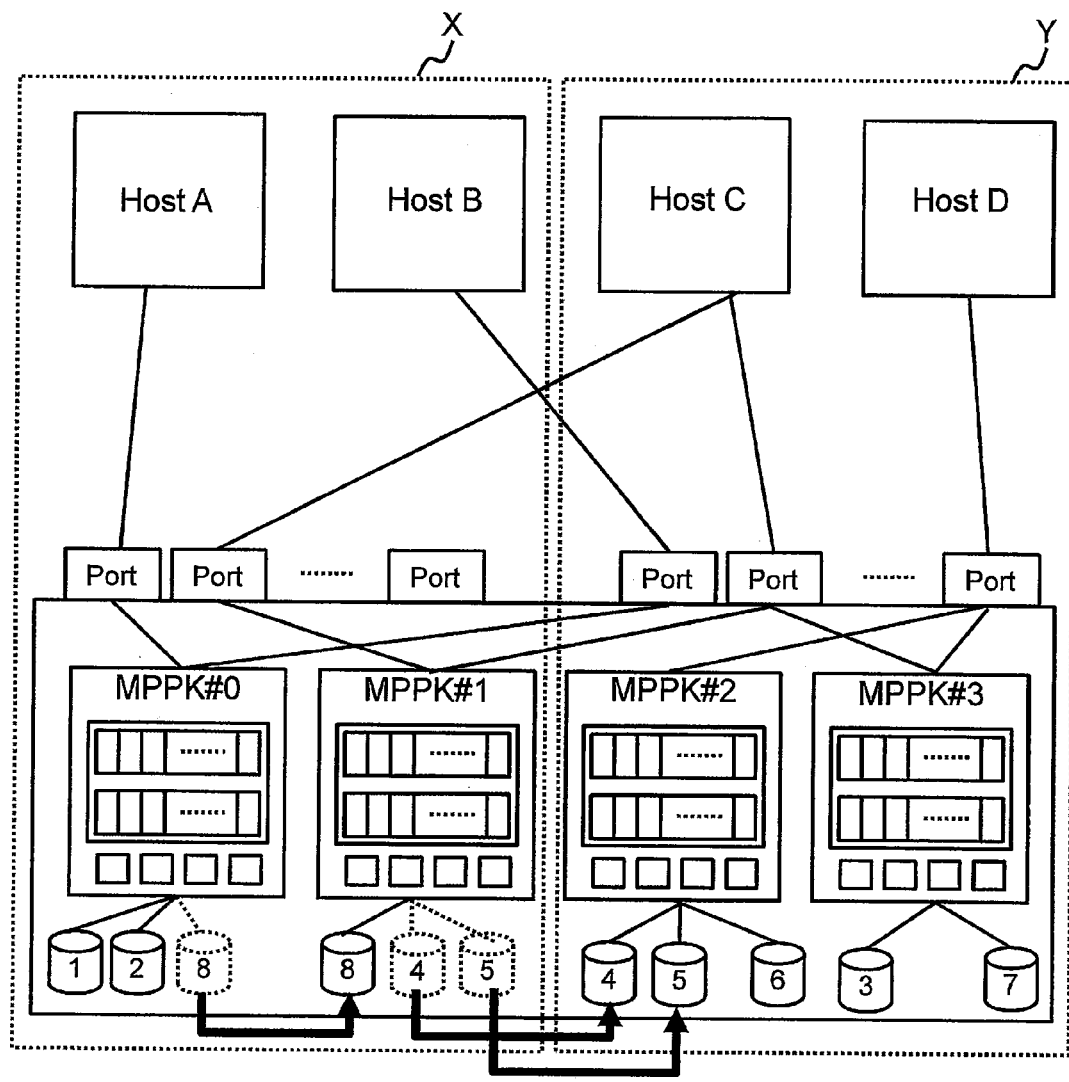
FIG. 29 is a diagram showing an example of the migration of the LDEV ownership in the Qos zone change during the operation of the computer system.

FIG. 29 is a diagram showing an example of the migration of the LDEV ownership in the Qos zone change during the operation of the computer system.

Before the Qos zone is changed, let it be assumed that there are the Qos zones X and Y configured as shown in FIG. 28. In this state, let it be assumed that the I/O commands from the hosts A and B has increased and that the load of the MPPK #0 has increased.

In the foregoing case, for example, by migrating the ownership of the LDEV allocated to the MPPK #0 to another MPPK, the load of the MPPK #0 can be reduced.

Here, the migration destination of the LDEV ownership of the MPPK #0 needs to be in the Qos zone X including the MPPK #0. This is because the LDEV corresponding to the ownership in the possession of the MPPK #0 is an LDEV that is included in the Qos zone X.

Nevertheless, according to the Qos zone X shown in FIG. 28, there is no other MPPK than the MPPK #0.

Thus, the MP 264, the SVP 220 or the Qos main control unit 10 may perform the following processing upon detecting that the load of the MPPK #0 (for example, the total number of I/O commands accumulated in the MPPK #0 or the number of registered queues regarding at least one PQ) has exceeded a predetermined threshold value:

(a) include one or more MPPKs (MPPK #1) in one of the other Qos zones (Qos zone Y) in the Qos zone X (here, for example, the table shown in FIG. 27 is updated so that the MPPK #1 is included in the Qos zone Y);

(b) migrate the ownership of the LDEVs #4 and #5 of the MPPK #1 to one of the MPPKs (MPPK #2) in the Qos zone Y; and (c) migrate the ownership of the LDEV #8 in the possession of the existing MPPK #0 in the Qos zone X to the MPPK #1 that was newly added to the Qos zone.

The reason for performing (b) above is because the LDEVs #4 and #5 are LDEVs that are included in the Qos zone Y.

The reason for performing (c) above is to distribute the load of the existing MPPK to the newly added MPPK by migrating the ownership to the newly added MPPK. Note that in (c) above, the LDEV corresponding to the ownership to be migrated will be one of the following; for example: (*) the LDEV that is designated in the I/O command accumulated in a PQ with a load that is higher than the expected value among a plurality of PQs in the possession of the existing MPPK #0;

(*) the LDEV that was arbitrarily selected among a plurality of LDEVs allocated to the existing MPPK #0; or (*) the LDEV with the highest I/O frequency among a plurality of LDEVs allocated to the existing MPPK #0.

As a result of performing the foregoing processing, the load of the MPPK #0 can be reduced.

Note that which MPPK should be added to which Qos zone and/or which MPPK should be removed from which Qos zone may be decided based on one or more types of operational status information in the SM 241; specifically, for example, based on the load of which MPPK in which Qos zone has become higher than a predetermined threshold value, or which MPPK in which Qos zone has been subject to a failure.

Pursuant to the migration of the LDEV ownership, the Qos main control unit 10, the SVP 220 or the MP 264 may migrate the I/O command (for example, an I/O command that has not yet been run and which is accumulated in an entry (for example, an entry in the PQ or IMQ)) designating the LDEV corresponding to the ownership to be migrated from the MPPK of the migration source to the MPPK of the migration destination.

An embodiment of the present invention has been explained above, but this is merely an exemplification for explaining the present invention, and is not intended to limit the scope of the present invention to this embodiment. The present invention is workable in various other modes.

For instance, the SVP 220 may be omitted. Here, one of the MPs 264 may function as the SVP 220.

REFERENCE SIGNS LIST

10 . . . Qos main control unit, 20 . . . host, 100 . . . storage apparatus

The invention claimed is:

1. A storage control apparatus which receives from a host computer an I/O command given a priority and designating a logical volume, and inputs and outputs data to and from the logical volume designated in the I/O command when the I/O command is run, the storage control apparatus comprising:

a plurality of ports for receiving I/O commands from one or more host computers;

a plurality of command storage areas which respectively correspond to a plurality of priorities and are common to the plurality of ports; and a plurality of processors which are common to the plurality of command storage areas, wherein, regardless of any of the ports receives an I/O command, the I/O command is stored in a command storage area corresponding to the priority given to the I/O command among the plurality of command storage areas which are common to the plurality of ports, and wherein the plurality of processors run the I/O commands in the plurality of command storage areas so that an I/O command with a higher priority is run more often within a given period of time, the storage control apparatus further comprising:

a plurality of communication interface devices, and a plurality of processors units, wherein the plurality of communication interface devices include the plurality of ports, wherein each communication interface device transfers the received I/O command to any of the processor units among the plurality of processors units, wherein each processor unit includes the plurality of processors and the plurality of command storage areas, wherein the plurality of processors run the I/O commands in a round robin in each of the processor units, and the storage control apparatus still further comprising:

a shared area which is a storage area which is common to the plurality of processors units, wherein each processor stores, in the shared area, operational status information which is information representing an operational status concerning a processor unit including the processor, wherein at least one logical volume among the plurality of logical volumes is allocated to each of two or more processor units among the plurality of processors units, wherein only a processor in a processor unit to which a logical volume is allocated is allowed to input and output data to and from the logical volume, wherein each communication interface device transfers the received I/O command to a processor unit to which is allocated a logical volume which is designated in the I/O command, wherein a controller:

(x) decides which logical volume allocated to which processor unit should be changed based on operational status information of the plurality of processor units in the shared area;

(y) allocates the decided logical volume to a second processor unit which is a processor unit which is separate from the decided processor unit, in substitute for a first processor unit which is the decided processor unit, wherein the controller is any of the processors within the plurality of processors units or a processor which is separate from the processors in the plurality of processors units, wherein the storage control apparatus is logically divided into a plurality of zones, wherein each of the plurality of zones includes one or more processor units and one or more logical volumes, wherein the first processor unit is a processor unit in which load thereon is exceeding a predetermined threshold value, wherein the second processor unit is a processor unit in a second zone which is a zone which is separate from a first zone which is a zone including the first processor unit, wherein the controller:

(a) includes the second processor unit in the first zone;

(b) allocates one or more logical volumes allocated to the second processor unit to one or more processor units in the second zone;

(c) at the (y), allocates a logical volume decided among two or more logical volumes allocated to the first processor unit to the second processor unit which is newly added to the first zone, and wherein the logical volume decided at the (x) is a logical volume which is designated in an I/O command to be accumulated in a command storage area with a load which is higher than an expected value.

* * * * *